(12) United States Patent
Tsuchitoi

(10) Patent No.: US 8,953,212 B2
(45) Date of Patent: Feb. 10, 2015

(54) IMAGE FORMING APPARATUS AND METHOD, IMAGE FORMING SYSTEM, AND COMPUTER READABLE MEDIUM

(75) Inventor: Yuki Tsuchitoi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 187 days.

(21) Appl. No.: 13/370,861

(22) Filed: Feb. 10, 2012

(65) Prior Publication Data

US 2013/0050748 A1     Feb. 28, 2013

(30) Foreign Application Priority Data

Aug. 22, 2011  (JP) ................................. 2011-180282

(51) Int. Cl.
| | | |
|---|---|---|
| G06F 9/00 | (2006.01) | |
| G06K 15/02 | (2006.01) | |
| H04N 1/40 | (2006.01) | |
| G06F 3/12 | (2006.01) | |
| G06F 3/03 | (2006.01) | |
| G06F 3/0354 | (2013.01) | |

(52) U.S. Cl.
CPC ............ *G06F 3/1207* (2013.01); *G06F 3/1242* (2013.01); *G06F 3/1259* (2013.01); *G06F 3/1285* (2013.01); *G06F 3/0317* (2013.01); *G06F 3/03545* (2013.01); *G06F 3/121* (2013.01); *G06F 2206/1514* (2013.01)
USPC .......................... 358/1.16; 358/1.15; 358/448

(58) Field of Classification Search
CPC ......... H04N 1/40; H04N 1/00233; G06F 9/00
USPC ................................................. 358/1.16
See application file for complete search history.

(56) References Cited

U.S. PATENT DOCUMENTS

| | | | |
|---|---|---|---|
| 6,993,527 B1 * | 1/2006 | Raman et al. ................. | 715/237 |
| 8,373,888 B2 * | 2/2013 | Miyagi et al. ................ | 358/1.18 |
| 8,441,666 B2 * | 5/2013 | Tomii et al. .................. | 358/1.15 |
| 8,472,065 B2 * | 6/2013 | Ito ................................ | 358/1.15 |

(Continued)

FOREIGN PATENT DOCUMENTS

| | | |
|---|---|---|
| JP | A-2006-504181 | 2/2006 |
| JP | A-2007-243380 | 9/2007 |

(Continued)

*Primary Examiner* — Marivelisse Santiago Cordero
*Assistant Examiner* — Daryl Jackson
(74) *Attorney, Agent, or Firm* — Oliff PLC

(57) ABSTRACT

An image forming apparatus includes the following elements. A first obtaining unit obtains a print request including image forming data used for forming an image for each of logical pages. An output unit outputs a print medium on which an image is formed. A combining unit obtains, in response to the print request, from an external device that manages identifiers for specifying output numbers, information concerning a set of identifiers that specify the logical pages and an output number, and combines the obtained information with an image. A second obtaining unit obtains information concerning the identifiers combined with the image. A third obtaining unit obtains, if execution of the print request has stopped, print request stop information. A sending unit sends the obtained information concerning the identifiers and the print request stop information to the external device in association with each other.

11 Claims, 21 Drawing Sheets

(56) References Cited

U.S. PATENT DOCUMENTS

| | | | |
|---|---|---|---|
| 2006/0156942 A1* | 7/2006 | Hofmann | 101/484 |
| 2006/0217826 A1* | 9/2006 | Matsuya | 700/90 |
| 2007/0211305 A1 | 9/2007 | Tanida | |
| 2008/0309956 A1* | 12/2008 | Yano et al. | 358/1.9 |
| 2009/0161149 A1* | 6/2009 | Noguchi et al. | 358/1.15 |
| 2011/0013209 A1* | 1/2011 | Yamazaki | 358/1.9 |
| 2012/0320419 A1* | 12/2012 | Ito | 358/1.15 |

FOREIGN PATENT DOCUMENTS

| | | |
|---|---|---|
| JP | A-2008-282411 | 11/2008 |
| JP | B2-4215516 | 1/2009 |
| WO | WO 02/082366 A1 | 10/2002 |
| WO | WO 2004/038651 A1 | 5/2004 |

* cited by examiner

| ID | DOCUMENT ID | PAGE NO. | OUTPUT NUMBER | HEADER FLAG | END FLAG |
|---|---|---|---|---|---|
| 30 | DOC001 | 1 | 1 | 1 | 0 |
| 31 | DOC001 | 2 | 1 | 0 | 0 |
| 32 | DOC001 | 3 | 1 | 0 | 0 |
| 33 | DOC001 | 4 | 1 | 0 | 0 |
| 34 | DOC001 | 5 | 1 | 0 | 0 |
| 35 | DOC001 | 1 | 2 | 0 | 0 |
| 36 | DOC001 | 2 | 2 | 0 | 0 |
| 37 | DOC001 | 3 | 2 | 0 | 0 |
| : | : | : | : | : | : |
| 44 | DOC001 | 5 | 3 | 0 | 1 |
| 45 | DOC002 | 1 | 1 | 1 | 1 |

PRINT REQUEST STATUS: NORMAL END
FINAL IDENTIFIER: 44

PRINT REQUEST STATUS: TERMINATED
FINAL IDENTIFIER: 34

FIG. 13

| ID | DOCUMENT ID | PAGE NO. | COPY NUMBER | HEADER FLAG | END FLAG |
|---|---|---|---|---|---|
| 30 | DOC001 | 1 | 1 | 1 | 0 |
| 31 | DOC001 | 2 | 1 | 0 | 0 |
| 32 | DOC001 | 3 | 1 | 0 | 0 |
| 33 | DOC001 | 4 | 1 | 0 | 0 |
| 34 | DOC001 | 5 | 1 | 0 | 1 |
| 35 | | | | | |
| 36 | | | | | |
| 37 | | | | | |
| ⋮ | ⋮ | ⋮ | ⋮ | ⋮ | ⋮ |
| 44 | | | | | |
| 45 | DOC002 | 1 | 1 | 1 | 1 |

FIG. 14

| ID | DOCUMENT ID | PAGE NO. | COPY NUMBER | HEADER FLAG | END FLAG |
|---|---|---|---|---|---|
| 30 | DOC001 | 1 | 1 | 1 | 0 |
| 31 | DOC001 | 2 | 1 | 0 | 0 |
| 32 | DOC001 | 3 | 1 | 0 | 0 |
| 33 | DOC001 | 4 | 1 | 0 | 0 |
| 34 | DOC001 | 5 | 1 | 0 | 1 |
| 35 | DOC005 | 1 | 1 | 1 | 0 |
| 36 | DOC005 | 2 | 1 | 0 | 0 |
| 37 | DOC005 | 1 | 2 | 0 | 0 |
| ⋮ | ⋮ | ⋮ | ⋮ | ⋮ | ⋮ |
| 44 | DOC005 | 2 | 5 | 0 | 1 |
| 45 | DOC002 | 1 | 1 | 1 | 1 |

IMAGE FORMING APPARATUS AND METHOD, IMAGE FORMING SYSTEM, AND COMPUTER READABLE MEDIUM

CROSS-REFERENCE TO RELATED APPLICATIONS

This application is based on and claims priority under 35 USC 119 from Japanese Patent Application No. 2011-180282 filed Aug. 22, 2011;

BACKGROUND (i) Technical Field

The present invention relates to an image forming apparatus and method, an image forming system, and a computer readable medium.

SUMMARY

According to an aspect of the invention, there is provided an image forming apparatus including: a first obtaining unit that obtains a print request including image forming data which is used for forming an image for each of logical pages; an output unit that outputs a print medium on which an image is formed on the basis of the image forming data; a combining unit that obtains, in response to the print request, from an external device that manages identifiers for specifying output numbers indicating a chronological order in which sets of logical pages are output, information concerning each of identifiers forming a set of identifiers that specify the logical pages corresponding to the image forming data and an output number indicating a chronological order in which a set of the logical pages is output, and that combines the obtained information with an image formed on each of physical pages output by the output unit; a second obtaining unit that obtains information concerning each of the identifiers combined with the image formed on the print medium output by the output unit; a third obtaining unit that obtains, if execution of the print request has stopped, print request stop information indicating a reason why the execution of the print request has stopped; and a sending unit that sends the information concerning each of the identifiers obtained by the second obtaining unit and the print request stop information obtained by the third obtaining unit to the external device in association with each other.

BRIEF DESCRIPTION OF THE DRAWINGS

Exemplary embodiment(s) of the present invention will be described in detail based on the following figures, wherein:

FIG. 13 illustrates an example of a table in which information concerning document IDs, etc., have been deleted in order to recover identifiers;

FIG. 14 illustrates an example of a table in which recovered identifiers are secured again as a free identifier space;

DETAILED DESCRIPTION

Exemplary embodiments of the present invention will be described below in detail with reference to the accompanying drawings.

First Exemplary Embodiment

Figure 1:
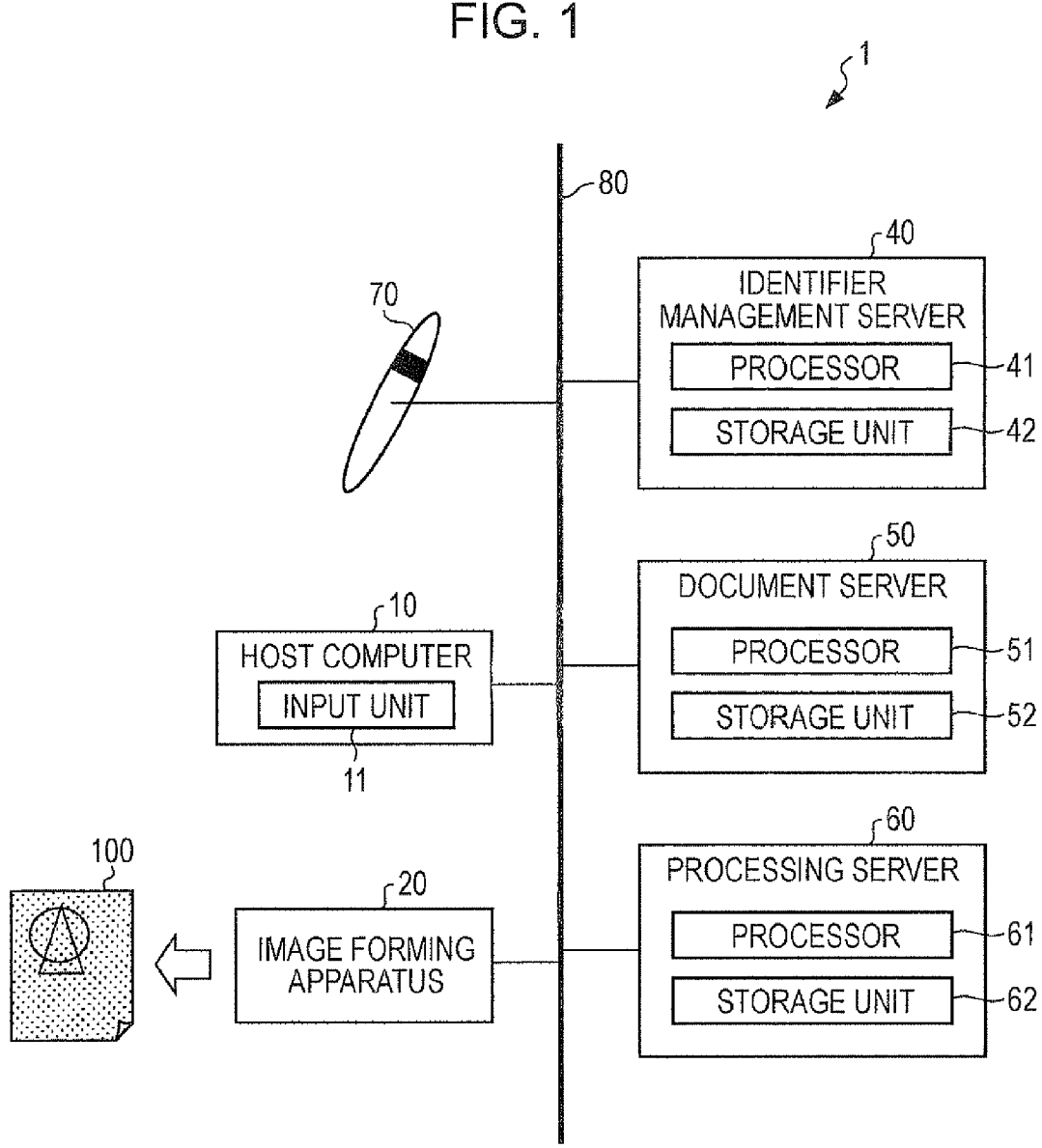
FIG. 1 is a block diagram schematically illustrating an image processing system of an exemplary embodiment of the invention.

A first exemplary embodiment will be discussed below. FIG. 1 schematically illustrates an image processing system 1 according to the first exemplary embodiment.

The image processing system 1 includes, as shown in FIG. 1, a host computer 10, an image forming apparatus 20, an identifier management server 40, a document server 50, a processing server 60, and a scanner pen 70.

The host computer 10, the image forming apparatus 20, the identifier management server 40, the document server 50, the processing server 60, and the scanner pen 70 are connected to one another via a wired or wireless communication medium 80, e.g., a local area network (LAN), the Internet, or a standard public telephone circuit.

The host computer 10 outputs a print request to the image forming apparatus 20 so that print documents, graphics, etc., which are input and created by a user are printed on a print medium.

The host computer 10 includes an input unit (a keyboard, a mouse, a touch panel, etc.) through which a user is able to set various items of a print output format when printing is performed.

Examples of the items of the print output format are the number of print copies (total number of output copies), a storage unit in which sheets are stored, a discharge format (output format) in which printed sheets are discharged, whether simplex printing or duplex printing is performed, a discharge unit to which printed sheets are discharged, a discharge order in which printed sheets are discharged, and whether a staple function is used. For example, examples of the discharge format are collate output and stack output when multiple number of print copies are output (hereinafter also referred to as the "collate/stack output"). Examples of the discharge unit to which printed sheets are discharged are a large-capacity discharge unit and a face up tray that allows the printed sides of sheets to be output facing upward.

The collate output is a format in which multiple print copies are output in units of consecutive logical pages and the numbers in the printing chronological order are indicated, and more specifically, a complete set of logical pages is output, then, another complete set of logical pages is output, and so on. The stack output is a format in which multiple print copies are output such that the same logical pages are output plural times equal to the number of print copies, for example, the first pages of the logical pages are first, and then, the second pages are output, and so on.

When a user sets the individual items of the print output format by using the input unit 11 and gives an instruction to perform printing, the host computer 10 configured as described above executes software processing necessary for printing by using a printer driver (not shown).

The host computer 10 executes software processing on an image (application data) to be printed and the individual items of the print output format set by the user so that the image and the print output format are compatible with the image forming apparatus 20. More specifically, the host computer 10 executes software processing for processing an image into print data (output data) so that the image forming apparatus 20 can process the output image, and software processing for converting the items of the print output format set by the user into output format instructions that can be read by the image forming apparatus 20.

The host computer 10 then creates a print file in which the print data and the output format instructions obtained by the above-described processing are formed into one print request. The host computer 10 then sends the created print file to the image forming apparatus 20 via the communication medium 80.

The image forming apparatus 20 performs image forming processing on the basis of the print file (print request) sent from the host computer 10.

Figure 2:
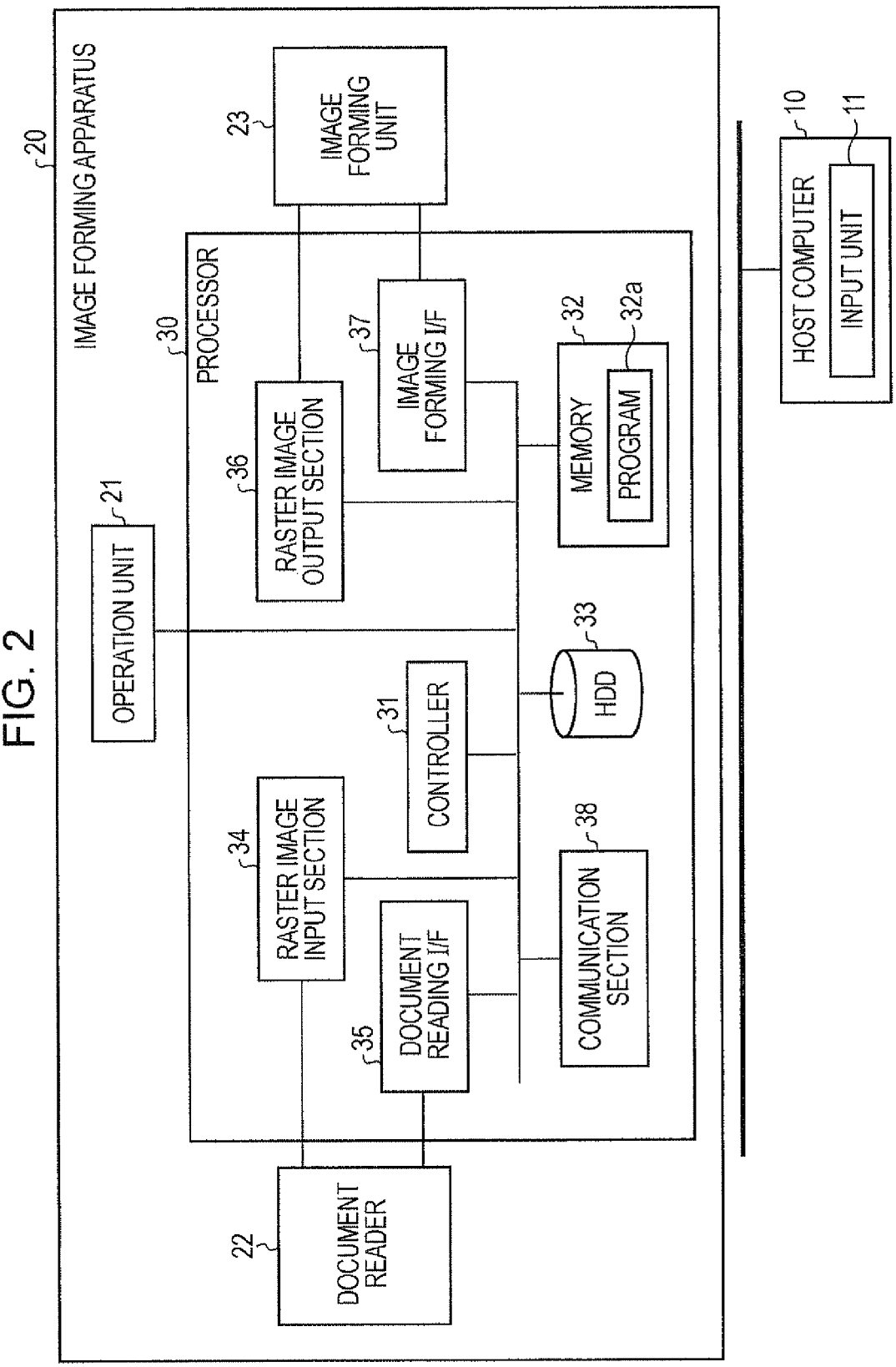
FIG. 2 is a block diagram illustrating an example of the configuration of an image forming apparatus.

FIG. 2 illustrates an example of the configuration of the image forming apparatus 20.

The image forming apparatus 20 includes, as shown in FIG. 2, an operation unit 21, a document reader 22, an image forming unit 23, and a processor 30.

The operation unit 21 serves as an input/output unit through which information is input and output. For example, the operation unit 21 is an operation panel integrally including a display unit (display screen) on which information is displayed for a user and an input unit into which an instruction is input through an operation of a user.

The processor 30 performs various types of operations for the image forming apparatus 20.

The processor 30 includes, as shown in FIG. 2, a controller 31, a memory 32, a hard disk drive (HDD) 33, a raster image input section 34, a document reading interface (I/F) 35, a raster image output section 36, an image forming I/F 37, and a communication section 38.

The controller 31 performs various control operations. For example, by executing a print request, the controller 31 controls the image forming I/F 37 so that a raster image is output from the raster image output section 36 to the image forming unit 23 and an image corresponding to the raster image is formed on a sheet by using the image forming unit 23. Additionally, by executing a copy request, the controller 31 controls the document reading I/F 35 and the image forming I/F 37 to implement the following image formation. A raster image of a document read by the document reader 22 is stored in the raster image input section 34, and the raster image stored in the raster image input section 34 is output to the raster image output section 36 and is then output to the image forming unit 23. An image corresponding to the raster image is then printed on a sheet by using the image forming unit 23.

In the memory 32 and the HDD 33, data or information necessary for various operations are stored. For example, in the memory 32, a program 32a and data used by the controller 31 are stored.

The program 32a may be stored at the time of shipping of the image forming apparatus 20. Alternatively, after the shipping of the image forming apparatus 20, the program 32a may be read from a storage medium, such as a compact disc -read only memory (CD-ROM), through an operation of a user, and be stored in the memory 32.

The communication section 38 performs communication with the host computer 10. Upon receiving a print file through the communication section 38, the image forming apparatus 20 informs the controller 31 of the reception of the print file by interrupt handling.

Upon receiving information indicating the reception of the print file from the communication section 38, the controller 31 analyzes the content of the print file after the print file has been stored or while the print file is being stored in the memory 32 or the HDD 33. If it is determined, as a result of analyzing the print file, that the print file is a file for forming images, the controller 31 generates a print control command, which is a unit of internal processing, and executes the generated print control command. That is, the controller 31 reads print data from the print file and loads the read print data into the memory 32 as raster images by using an imaging program.

The controller 31 also reads output format instructions (output format information) from the print file. Then, in accordance with the content of the read output format instructions, the controller 31 specifies, for the image forming unit 23, an output format, such as which paper feeder is used, whether simplex printing or duplex printing is performed, and whether a stapler is used.

The controller 31 then sequentially outputs raster images selected in accordance with the image forming unit 23.

If printing of multiple print copies is specified by the output format instruction, the image forming apparatus 20 performs the following output processing.

In the case of printing of multiple print copies using the collate output, if the number of pages is more than a preset value (e.g., a memory capacity), it may not be possible that raster images for a number of pages to be printed are loaded into the memory 32. Accordingly, the controller 31 temporarily stores raster images which have been loaded into the memory 32 in the HDD 33. Then, when necessary, the controller 31 reads raster images from the HDD 33, loads them into the memory 32, and then sends the raster images to the image forming unit 23. With this operation, in the case of the collate output, the image forming apparatus 20 prints plural number of print copies in units of consecutive logical pages, i.e., in the order of logical pages, such as 1, 2, 3, 4, . . . 1, 2, 3, 4, . . . , and so on.

If printing of multiple print copies using the stack output is specified, the same images are sequentially printed for the number of outputs (print copies). Accordingly, the controller 31 loads a raster image into the memory 32 and sends the loaded raster image for the number of outputs to the image forming unit 23. With this operation, if three print copies are printed, the image forming apparatus 20 prints plural number of print copies starting from the first page for three print copies, such as 1, 1, 1, 2, 2, 2, and 3, 3, 3 . . . .

In this manner, by using the image forming apparatus 20, printed matter can be obtained in accordance with output format instructions set by the host computer 10.

Recently, the following system has been proposed. Coordinate information is embedded into a print side of a sheet as position codes, and by reading the position codes, positions on the sheet are specified. For example, position codes embedded in a print side of a sheet are read by using a scanner pen having a built-in scanner, and the scanner pen sends information indicating handwriting (strokes) written on the sheet, together with information concerning the read position codes, to a server, etc.

In this system, only information obtained by using the scanner pen (position information and stroke information) is sent to a server, etc., and upon receiving such information, the server checks the received information against text of an original document, e.g., a questionnaire, thereby making it possible to determine marked positions (checked positions) on a sheet of the questionnaire without collecting a questionnaire sheet. Accordingly, such a system is very convenient since electronic data can be automatically formed from paper.

In contrast, Japanese Patent No. 4215516, Japanese Unexamined Patent Application Publication (Translation of PCT Application) No. 2006-504181, and Japanese Unexamined Patent Application Publication No. 2008-282411 disclose a technology for embedding coordinate information (position information) when images are formed. Those publications disclose an embedding method used in a so-called "print on demand" system in which a document having embedded coordinate information is output by using, not a printing press, but a printer.

In the construction of such a system, a mechanism for differentiating printed matter that requires collection of information from printed matter that does not require collection of information is necessary. With the provision of only coordinate information, it is difficult to determine whether writing has been performed on printed matter that requires collection of information or on printed matter that does not require collection of information. With the provision of only coordinate information, it is also difficult to determine to which page (logical page) of which document a page (physical page) read by using a pen is associated.

From this background, the technology disclosed in Japanese Unexamined Patent Application Publication (Translation of PCT Application) No. 2006-504181 provides the following method. The assignment of physical pages to position data is performed by using a position assigner. The association between the physical pages and the position data is stored as data in the system, and when necessary, the data is provided. However, even with this method, the following problem may arise.

An image forming apparatus that embeds position data and performs printing has to query an external server regarding information necessary for embedding position data into each physical page. Accordingly, it is not possible for the image forming apparatus to perform printing before receiving a response to the query, which makes the time taken to perform printing long.

Thus, the following method using, not a position assigner, but identifications (IDs) using numeric values, may be considered.

In this case, in a system, an output instructing section that gives output instructions to an image forming apparatus determines a space of IDs from the number of physical pages to be printed on the basis of a print request, and reserves a continuous zone of numeric values as a required number of IDs. The output instruction section then supplies, together with the print request, the head numeric value (head ID) of the continuous zone to the image forming apparatus. Upon receiving the head ID, in accordance with printing processing based on the print request, the image forming apparatus of the system sequentially increments the numeric value by using the head numeric value (head ID) as the initial value and combines the sequentially obtained values, which serve as IDs, to images of individual physical pages, thereby printing the images. The output instruction section is adapted to check the IDs (numeric values) against text based on the print request. With this arrangement, in the system, text information is obtained on the basis of the IDs read from printed matter by using a pen.

In such a system, since communication between the output instruction section and the image forming apparatus is not performed during the execution of a print request, it is not necessary to make a query. As a result, in this system, the time taken to perform printing is decreased.

In this system, however, if a print request which is being executed in the image forming apparatus is interrupted by, for example, cancellation of a user, the image forming apparatus discontinues printing in half way through without using all the IDs in the ID space reserved by the output instruction section. As a result, in the ID space, some IDs are unused and are thus wasted.

For example, in the case of a print request to print ten print copies of text including 100 logical pages, the output instruction section reserves an ID space for 1000 (100×10) pages. However, if the image forming apparatus discontinues the print request in execution after one page was printed, IDs for the remaining 999 pages are unused and are thus wasted.

Japanese Unexamined Patent Application Publication No. 2007-243380 discloses the following technology. When printing has failed, ID information assigned to a recording medium is discarded, and another item of ID information is assigned to the recording medium when printing is restarted. Accordingly, in this technology, too, discarded ID information is unused and is thus wasted.

In contrast, in this exemplary embodiment, IDs are used without wasting them in accordance with the following configuration and processing.

In this exemplary embodiment, in response to an instruction to perform printing (output setting) and to embed coordinate information, the host computer 10 interprets the instruction as an instruction to embed identifier information, together with the coordinate information, into printed matter and executes processing necessary for printing in accordance with the interpreted instruction by using a printer driver.

In this case, the host computer 10 also sends document data to the document server 50 via the communication medium 80. In response to this, the host computer 10 receives document ID from the document server 50. The document ID is an ID for specifying document data.

Upon receiving the document ID, the host computer 10 sends an identifier securing request (also called a number request or an identifier issuing request) to the identifier management server 40 via the communication medium 80. The identifier securing request includes information concerning the number of logical pages of print data, the document ID, the number of outputs set by a user, and collate/stack output. The identifier securing request is a request for the identifier management server 40 to obtain an initial identifier (head identifier (identifier initial value), which will be discussed later).

Upon receiving information concerning the initial identifier from the identifier management server 40 in response to the identifier securing request, the host computer 10 creates one print file on the basis of the above-described print data output format instructions, coordinate information embedding instruction, and initial identifier information. To create a print file, the host computer 10 creates a print file by processing the above-described print data, output format instructions, coordinate information embedding instruction, and initial identifier information if necessary. The host computer 10 then sends the created print file to the image forming apparatus 20 via the communication medium 80.

The identifier management server 40 is a server that manages identifiers such that they are uniquely identified in the entire system. The identifier management server 40 includes, as shown in FIG. 1, a processor 41 and a storage unit 42.

Upon receiving an identifier securing request from the host computer 10, the identifier management server 40 searches for a free identifier space among identifier spaces managed by the storage unit 42. The identifier space is constituted of plural identifiers (plural numeric values). A free identifier space is an identifier space constituted of currently unused identifiers.

More specifically, the identifier management server 40 searches for an identifier space (space including continuous numeric values) having a capacity equal to the product (multiplication value) of the number of outputs and the number of logical pages (number of outputs x number of logical pages). For example, if the number of logical pages is five and the number of outputs is three, the identifier management server 40 searches for an identifier space constituted of 15 (=5×3) unused identifiers equal to the number of physical pages to be printed.

After searching for a free identifier space and reserving it, the identifier management server 40 stores, in the storage unit 42, information concerning the secured identifier space (identifier set), initial identifier information concerning the head identifier (identifier having the smallest numeric value) of the identifier space, information concerning the logical page numbers, information concerning the output numbers, collate/stack output information, and the document ID in association with one another.

Then, the identifier management server 40 sends the initial identifier information among the stored items of information to the host computer 10.

Figures 3, 4:
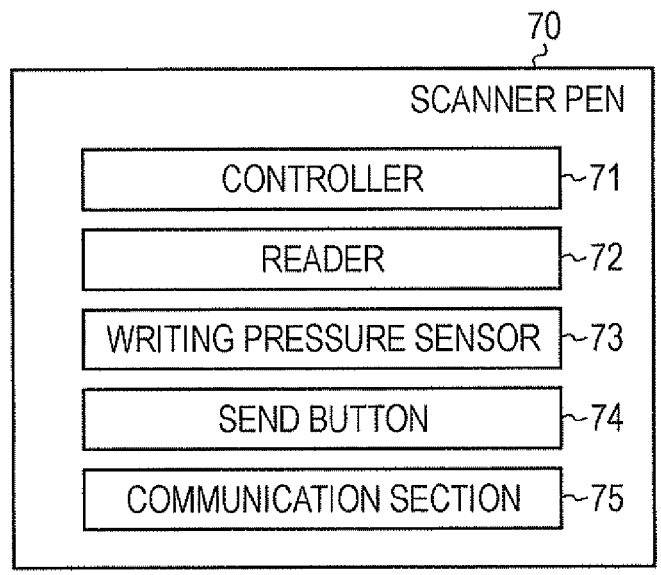
FIG. 3 illustrates an example of a table in which identifier information, etc. are stored.
FIG. 4 is a block diagram illustrating an example of the configuration of a scanner pen.

FIG. 3 illustrates an example of a table in which identifier information, etc. is stored by the identifier management server 40.

The identifier management server 40 stores, as shown in FIG. 3, an ID (identifier information), document ID, page number (logical page number), output number, head flag, and end flag in the storage unit 42 as a table format. The output numbers indicate the order in which multiple print copies are printed, in other words, the output numbers indicate the numbers in the printing chronological order.

For example, the identifier management server 40 calculates an ID which can uniquely identify a logical page regardless of the output format, on the basis of the number of outputs and the collate/stack output format information. That is, when calculating an ID, the ID is a value depending on the output format. However, when specifying a logical page, the ID is a value that uniquely specifies the logical page regardless of the output format. Then, the identifier management server 40 stores the ID calculated as described above, the page number (logical page number), and the output number in the storage unit 42 in association with one another.

The head flag (=1) is a flag that is set in the head ID (initial identifier) among IDs belonging to the same document ID. The end flag (=1) is a flag that is set in the final ID (final identifier secured in the identifier space) among IDs belong to the same document ID. Accordingly, in the document ID DOC002 shown in FIG. 3, since the head flag and the end flag are set in the same ID, it is understood that the document ID DOC002 is a document having only one logical page. The identifier management server 40 searches for a free identifier space on the basis of the head flag and the end flag. For example, the identifier management server 40 searches for a free identifier space among identifier spaces constituted of IDs greater than the ID in which the end flag is set.

The identifier management server 40 may manage identifier information, etc., by using a method other than the method using a table.

The identifier management server 40 secures the number of identifiers corresponding to the number of outputs and the number of logical pages as described above. However, if some identifiers are not used in the image forming apparatus 20, the identifier management server 40 recovers the unused identifiers. More specifically, the identifier management server 40 deletes information concerning identifiers (IDs) which were not used in the table shown in FIG. 3, thereby recovering such identifiers as reusable identifiers. Details of this recovery processing will be given later.

Upon receiving a request to obtain an identifier (identifier obtaining request) from the processing server 60, the identifier management server 40 obtains the association among the initial identifier information, information concerning the number of logical pages, information concerning the number of outputs, collate/stack output information, and the document ID, on the basis of the identifier information contained in the identifier obtaining request. That is, if the identifier management server 40 includes the table shown in FIG. 3, it obtains the association among the document ID, the page number (logical page number), the output number, and the collate/stack output information on the basis of the ID, which is the identifier information. The identifier management server 40 then sends the obtained information to the processing server 60. Details of an identifier obtaining request and responding processing performed by the identifier management server 40 will be given later.

The document server (print data server) 50 is a server that manages document data. The document server 50 includes, as shown in FIG. 1, a processor 51 and a storage unit 52.

Upon receiving document data from the host computer 10, the processor 51 of the document server 50 stores the received document data, together with a document ID for specifying the document data, in the storage unit 52. The document server 50 then returns the document ID corresponding to the received document data to the host computer 10.

A user can also store, in the document server 50, information (region information) indicating which item of information is to be written into which region of each logical page. With this configuration, upon a user inputting information concerning an item of information to be written and information concerning a specific coordinate region into which the item of information is written, the host computer 10 sends region information including the above-described information, together with document data, to the document server 50. Then, upon receiving the document data and the region information, the document server 50 stores them in association with each other.

Additionally, upon receiving a request to obtain document information (document information obtaining request) from the processing server 60, the document server 50 sends a page (document information, image information, etc.) of document data corresponding to a document ID and a logical page number contained in the request, together with region information if the region information is stored, to the processing server 60.

In the image forming apparatus 20, upon receiving a print file from the host computer 10, and if a coordinate information embedding instruction is embedded in the received print file, the controller 31 reads initial identifier information from the print file and stores it in the memory 32. The controller 31 also reads print data from the print file and stores it in the HDD 33. The controller 31 performs printing processing for loading the print data into the memory 32 as raster images and for creating a coordinate information image for each physical page.

The controller 31 performs processing for creating a coordinate information image for each physical page as follows.

The controller 31 initializes the first identifier to be assigned to the first physical page by using the initial identifier given in the print file (print request). By performing this initialization, the controller 31 sets the initial identifier in the first identifier of the first physical page which is printed first.

Then, every time the controller 31 performs page drawing processing for a physical page, it generates an identifier for the physical page on the basis of the first identifier set by performing the initialization. In this case, the controller 31 generates identifiers by executing computation similar to computation executed by the identifier management server 40. That is, the controller 31 generates, for each physical page, an ID that can uniquely specify a logical page regardless of the output format, on the basis of information concerning the number of outputs and the collate/stack output format.

Meanwhile, the controller 31 generates a coordinate information image in accordance with the size of a print sheet. The coordinate information image is an image constituted of coordinate information and is generated by using a coordinate-information-image generating program. The controller 31 delivers the identifier information to the coordinate-information-image generating program as a parameter and generates a coordinate information image including identifier information (coordinate information image combined with identifier information). The controller 31 generates a coordinate information image for each physical page and then loads the generated coordinate information images in the memory 32.

The controller 31 then combines a raster image based on print data with a coordinate information image and thereby generates a composite image. The controller 31 then forms the composite image on a sheet.

This processing will be discussed more specifically. The raster image output section 36 is configured to perform logical OR or exclusive OR on images stored in the plural memory devices by using an image composite function and to output the resulting image to the image forming unit 23. With this configuration, the controller 31 specifies a raster image loaded in the memory 32 and a coordinate information image (including identifier information) generated for a physical page which forms the raster image, and then instructs the raster image output section 36 to combine the specified raster image with the coordinate information image and to output the composite image. In response to this instruction, the raster image output section 36 outputs a signal representing the composite image to the image forming unit 23.

Upon receiving the signal from the raster image output section 36, the image forming unit 23 forms an image on a sheet on the basis of the signal. The image formed on the sheet by the image forming unit 23 is an image obtained by combining a code image representing the coordinate information and the identifier information with the raster image.

The image forming apparatus 20 combines identifier information with a raster image and also obtains final identifier information in association with a print request status. The print request status is information indicating the reason why the execution of a print request has stopped. The final identifier information is information concerning the identifier having the largest numeric value among identifiers (numeric values) combined with an image which has been printed by the execution of a print request using the image forming apparatus 20. Details of processing for obtaining final identifier information in association with a print request status will be given later.

The scanner pen 70 is configured to write information on a sheet by using a pen function and to read information stored in the sheet by using a scanner function.

FIG. 4 is a block diagram illustrating an example of the configuration of the scanner pen 70.

The scanner pen 70 includes, as shown in FIG. 4, a controller 71, a reader 72, a writing pressure sensor 73, a send button 74, and a communication section 75.

The scanner pen 70 is controlled by the controller 71. When detecting a writing pressure (e.g., a writing pressure equal to or greater than a preset value) by the writing pressure sensor 73, the reader 72 reads the content of information written in a read area on a sheet. When the send button 74 is depressed, the scanner pen 70 sends the read content of information to the processing server 60 by using the communication section 75.

For example, when writing information on a sheet 100 on which a code image including coordinate information and identifier information is printed, the scanner pen 70 performs the following processing.

In the scanner pen 70, when the reader 72 reads a code image printed on the sheet 100, the controller 71 reads coordinate information and identifier information from the code image by using a recognition function. When the send button 74 is depressed, the scanner pen 70 sends the read coordinate information and identifier information to a specific processing server 60 by using the communication section 75. If information is written on the sheet 100 by using the scanner pen 70, the controller 71 also collects stroke information concerning strokes of writing and sends the stroke information to the processing server 60.

The processing server 60 performs processing on the basis of the information sent from the scanner pen 70. The processing server 60 includes, as shown in FIG. 1, a processor 61 and a storage unit 62. Upon receiving information from the scanner pen 70, the processing server 60 extracts identifier information from the received information. The processing server 60 then sends an identifier obtaining request to the identifier management server 40 by using the extracted identifier information. The identifier obtaining request is a request to obtain a logical page number. The identifier obtaining request includes the identifier information.

Upon receiving information concerning a document ID and a logical page number from the identifier management server 40 in response to the identifier obtaining request, the processing server 60 sends a document information obtaining request to the document server 50 by using the received information concerning the document ID and the logical page number. The document information obtaining request is a request to obtain print data corresponding to the document ID and the logical page number (document information corresponding to the logical page number). The document information obtaining request includes the document ID and the logical page number.

Upon receiving document data (which may include region information) from the document server 50 in response to the document information obtaining request, the processing server 60 performs preset processing on the basis of the document data, and coordinate information and stroke information which have been sent from the scanner pen 70. For example, if the print data indicates a questionnaire sheet, the processing server 60 performs summarize processing for the questionnaire.

Processing executed by the image forming apparatus 20 will be described in a greater detail.

Figure 5:
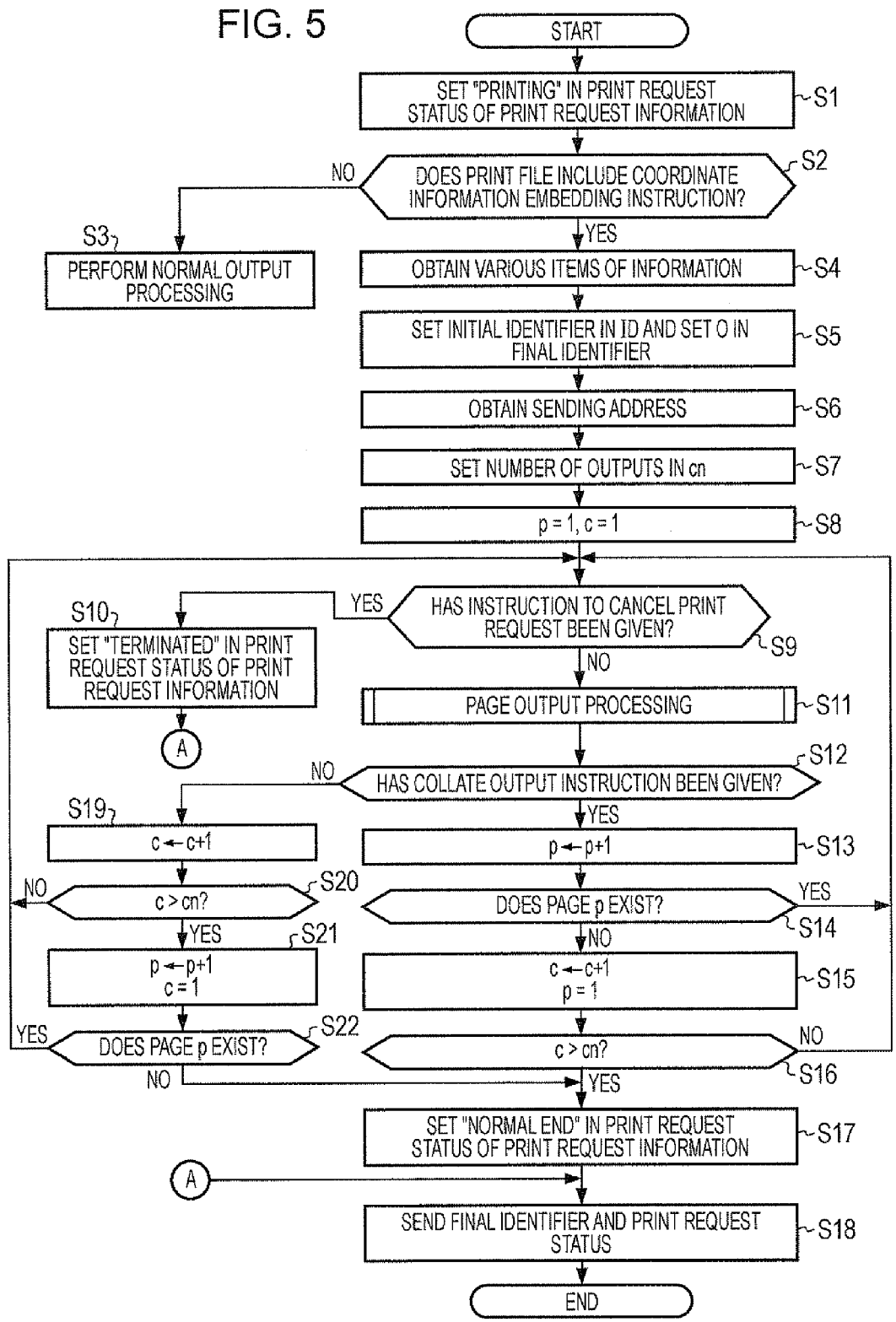
FIG. 5 is a flowchart illustrating an example of a printing process executed by the image forming apparatus according to a first exemplary embodiment.

FIG. 5 is a flowchart illustrating an example of a printing process executed by the image forming apparatus 20. The image forming apparatus 20 executes the printing process shown in FIG. 5 by using the controller 31.

In FIG. 5, in step Si, the controller 31 sets "printing" in a print request status of print request information.

Generally, an image forming apparatus is configured to store a print request status in a storage device, such as a non-volatile memory, e.g., an HDD, as print request information. Similarly, the image forming apparatus 20 of this exemplary embodiment stores a print request status in a storage device, e.g., the HDD 33, as print request information.

Then, in step S2, the controller 31 determines whether a print file includes a coordinate information embedding instruction. If the controller 31 determines that the print file includes a coordinate information embedding instruction, the process proceeds to step S4. If the controller 31 determines that the print file does not include a coordinate information embedding instruction, the process proceeds to step S3.

In step S3, the controller 31 performs normal image forming and output processing.

In step S4, the controller 31 obtains various items of information. More specifically, the controller 31 obtains information necessary for steps after step S4, i.e., information concerning an initial identifier, the number of outputs, and output format instructions indicating, e.g., whether collate or stack output is performed.

Then, in step S5, the controller 31 sets the initial identifier in the ID and also sets 0 in the final identifier.

In step S6, the controller 31 obtains a sending address. More specifically, the controller 31 obtains a preset Internet Protocol (IP) address of the identifier management server 40.

Alternatively, the controller 31 may obtain an IP address in the form of print request information and may obtain information concerning the IP address when a print request is output.

In step S7, the controller 31 sets the number of outputs in the value on.

Then, in step S8, the controller 31 sets 1 in the value p indicating the logical page number and also in the value c indicating the output number. That is, the controller 31 initializes the value p and the value c.

In step S9, the controller 31 determines whether an instruction to cancel the print request has been given. If the controller 31 determines that such an instruction has been given, the process proceeds to step S10. If the controller 31 determines that such an instruction has not been given, the process proceeds to step S11.

In step S10, the controller 31 sets "terminated" in the print request status of the print request information. The process then proceeds to step S18.

In step S11, the controller 31 executes output processing in units of physical pages (image forming processing). Details of the output processing in step S11 will be given later.

Then, in step S12, the controller 31 determines whether a collate output instruction has been given. If the result of step S12 is YES, the process proceeds to step S13. If the result of step S12 is NO, i.e., if a stack output instruction has been given, the process proceeds to step S19.

In step S13, the controller 31 adds one to the value p, i.e., the controller 31 increments the value p.

In step S14, the controller 31 determines whether the value p (logical page of the value p) exists. If the result of step S14 is YES, the process returns to step S9 and the processing is restarted from step S9. With this operation, the next logical page of the output number having the value c is printed. If the result of step S14 is NO, the process proceeds to step S15.

In step S15, the controller 31 adds one to the value c, i.e., the controller 31 increments the value c. The controller 31 also sets the value p to 1, i.e., the controller 31 initializes the value p.

In step S16, the controller 31 determines whether the value c set in step S15 is greater than the value cn set in step S7. If the controller 31 determines that the value c is greater than the value on (c>cn), the process proceeds to step S17. If the controller determines 31 that the value c is equal to or smaller than the value cn (c≤n), the process returns to step S9 and the processing is restarted from step S9. That is, the controller 31 starts printing from the first logical page of the subsequent output number.

In step S17, the controller 31 sets "normal end" in the print request status of the print request information. The process then proceeds to step S18.

In step S18, the controller 31 sends the final identifier and the print request status to the identifier management server 40 having the sending address set in step 36. Then, the controller 31 completes the printing process shown in FIG. 5.

The print request status handled in step S18 is the print request status set in step S10 or S17. Concerning the final identifier, 0 is first set in step S5 and is then set again in step S49, which will be discussed later. However, if a user cancels the print request without printing even one page, the final identifier remains 0.

In step S19, the controller 31 adds one to the value c, i.e., the controller 31 increments the value c.

Then, in step S20, the controller 31 determines whether the value c is greater than the value on set in step S7. If the controller 31 determines that the value c is greater than the value on (c>cn), the process proceeds to step S21. If the controller 31 determines that the value c is equal to or smaller than the value cn (c≤cn), the process returns to step S9.

In step S21, the controller 31 adds one to the value p, i.e., the controller 31 increments the value p. The controller 31 also sets 1 in the value c, i.e., the controller 31 initializes the value c.

In step S22, the controller 31 determines whether the value p exists. If the result of step S22 is YES, the process returns to step S9 and the processing is restarted from step S9. With this operation, the logical page having the value p of the next output number is printed. If the result of step S22 is NO, the process proceeds to step S17.

The output processing in units of physical pages in step S11 of FIG. 5 will be discussed in detail.

Figure 6:
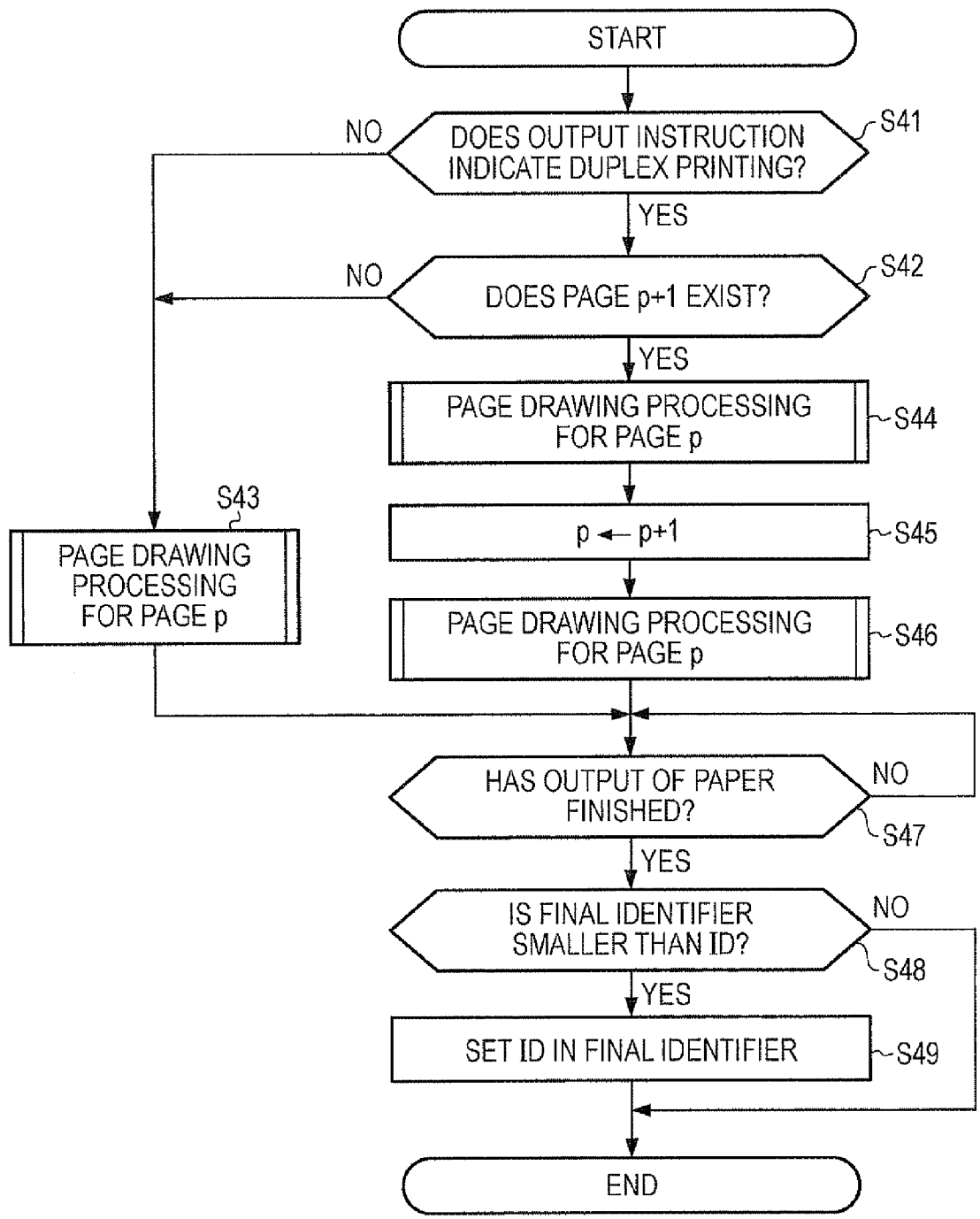
FIG. 6 is a flowchart illustrating an example of output processing in units of physical pages according to the first exemplary embodiment.

FIG. 6 is a flowchart illustrating an example of output processing in units of physical pages.

In step S41, the controller 31 determines whether the output instruction indicates duplex printing. If the result of step S41 is YES, the process proceeds to step S42. If the result of step S41 is NO, i.e., if the output instruction indicates simplex printing, the process proceeds to step S43.

In step S42, the controller 31 determines whether the value p+1 (back side) exists. If the result of step S42 is YES, the process proceeds to step S44. If the result of step S42 is NO, i.e., if the final page of the logical pages for which duplex printing has been instructed is the front side of a sheet, the process proceeds to step S43.

In step S43, the controller 31 performs page drawing processing for the value p (page p). The process then proceeds to step S47.

The page drawing processing in step S43 is executed in the output processing in units of physical pages, and more specifically, processing for drawing an image on the first physical page. Details of the page drawing processing will be given later.

In step S44, the controller 31 executes page drawing processing for the value p (page p). Details of the page drawing processing will be given later.

Then, in step S45, the controller 31 adds one to the value p, i.e., the controller 31 increments the value p.

In step S46, the controller 31 executes page drawing processing for the updated value p (page p). Details of the page drawing processing will be given later. The process then proceeds to step S47.

In step S47, the controller 31 determines whether a sheet on which an image was formed as a result of performing page drawing processing has been output. If the result of step S47 is YES, the process proceeds to step S48.

In step S48, the controller 31 determines whether the final identifier is smaller than the ID. If the result of step S48 is YES (final identifier<ID), the process proceeds to step S49. If the controller 31 determines that the final identifier is equal to or greater than the ID (final identifier≥ID), the output processing shown in FIG. 6 has been completed.

The ID is set to be the initial identifier in step S5 of FIG. 5, and is incremented in step S67, which will be discussed later.

In step S49, the controller 31 sets the ID in the final identifier. With this operation, the controller 31 updates the final identifier to a greater value. The controller 31 then completes the output processing shown in FIG. 6.

The setting of the final identifier in step S49 is performed after the execution of the page drawing processing (processing shown in FIG. 7) in steps S44 and 46 or step S43. Accordingly, printing corresponding to the ID set in the final identifier in step S49 has been successfully completed.

In this exemplary embodiment, depending on how the IDs are associated with the physical pages, there may be a possibility that an ID smaller than an ID combined with an already printed image is combined with an image to be printed. In this exemplary embodiment, however, it is desired that the ID (identifier) having the maximum value among IDs assigned to pages that have been successfully printed be obtained. For those reasons, assuming that the ID which has already been set in the final identifier may be greater than an ID which will be set, steps S48 and S49 are executed. With this operation, if the ID corresponding to printing which has been successfully completed this time is greater than the already set final identifier, the controller 31 sets the ID in the final identifier.

The page drawing processing in step S43, S44, or S46 of FIG. 6 will be discussed in detail.

Figure 7:
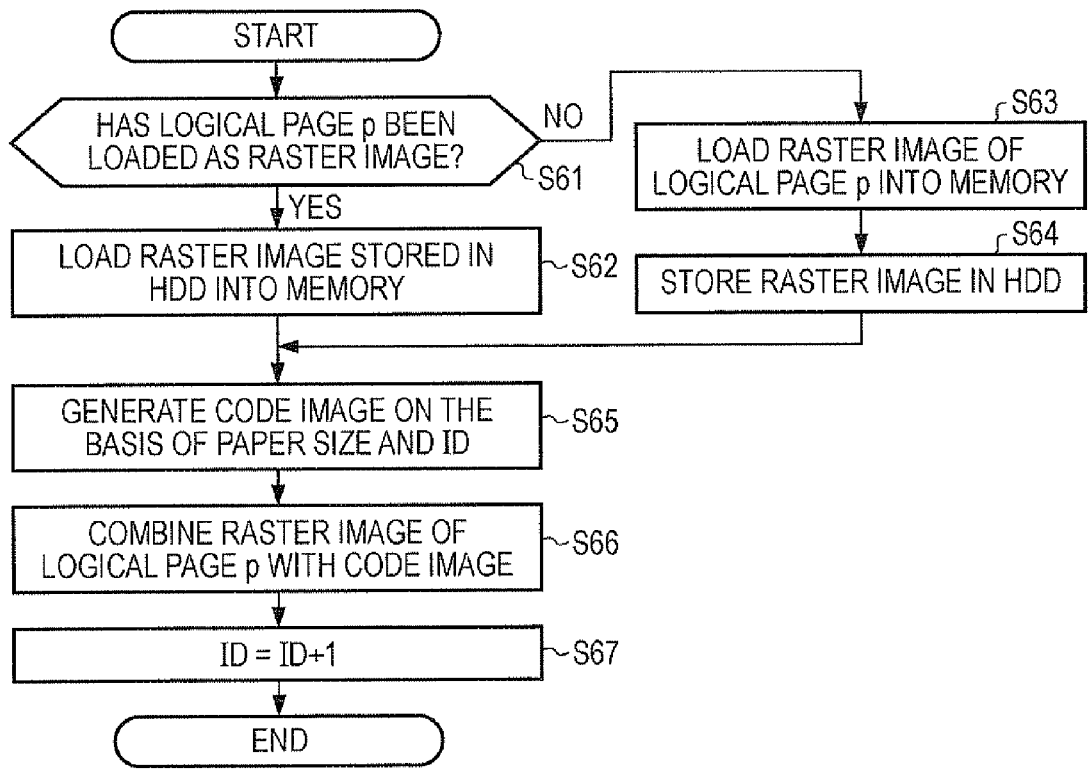
FIG. 7 is a flowchart illustrating an example of page drawing processing.

FIG. 7 is a flowchart illustrating an example of the page drawing processing.

In FIG. 7, in step S61, the controller 31 determines whether the logical page having the value p (page p) has been loaded as a raster image. That is, the controller 31 determines whether the logical page having the value p has been loaded into the memory 32 as a raster image and whether the raster image has been stored in the HDD 33. If the result of step S61 is YES, the process proceeds to step S62. If the result of step S61 is NO, the process proceeds to step S63.

In step S62, the controller 31 reads the raster image of the logical page having the value p from the HDD 33, and loads the raster image into the memory 32. The process then proceeds to step S65.

In step S63, the controller 31 loads the raster image of the logical page having the value p into the memory 32.

Then, in step S64, the controller 31 stores the raster image of the logical page loaded into the memory 32 in step S63 in the HDD 63. The process then proceeds to step S65.

In step S65, the controller 31 generates a code image (obtained by coding an identifier ID, which is identifier information, and coordinate information) on the basis of the sheet size and the ID.

Then, in step S66, the controller 31 combines the code image generated in step S65 with the raster image loaded into the memory 32 in step S62 or S63, thereby generating a composite image. The controller 31 then forms an image on a sheet on the basis of the composite image.

Then, in step S67, the controller 31 adds one to the ID. The controller 31 then completes the page drawing processing shown in FIG. 7.

The identifier recovery processing executed by the identifier management server 40 will be discussed in detail.

Figure 8:
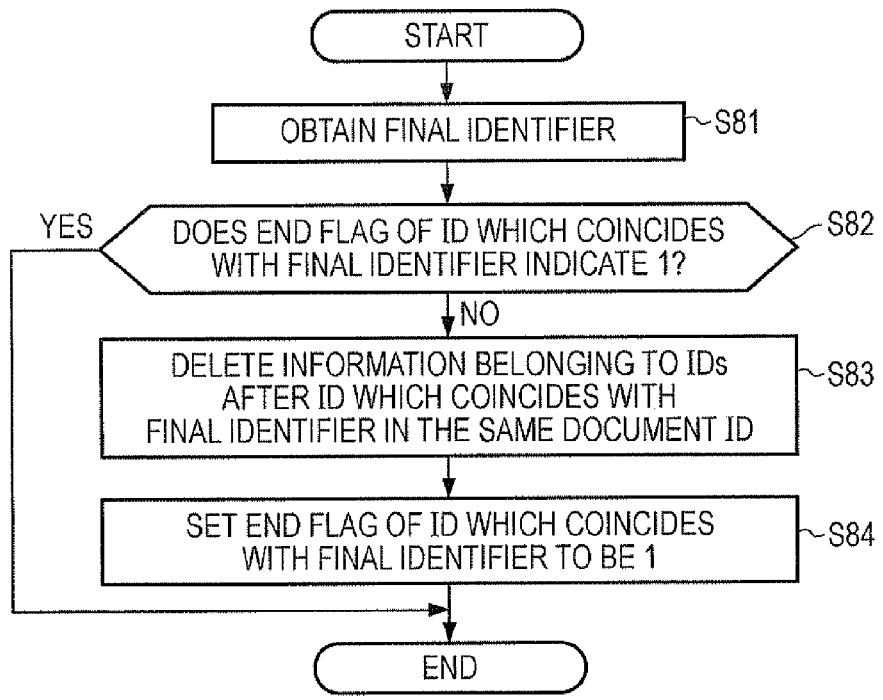
FIG. 8 is a flowchart illustrating an example of identifier recovery processing.

FIG. 8 is a flowchart illustrating an example of the identifier recovery processing. The identifier management server 40 executes the processing shown in FIG. 8 by using the processor 41.

In FIG. 8, in step S81, the processor 41 obtains the final identifier. More specifically, the processor 41 obtains the final identifier sent from the image forming apparatus 20.

Then, in step S82, the processor 41 refers to a table, such as the table shown in FIG. 3, used for managing IDs, etc., and determines whether the end flag of the ID that coincides with the final identifier is 1. If the result of step S82 is YES, the processor 41 completes the identifier recovery processing shown in FIG. 8. If the result of step S82 is NO, i.e., if the end flag of the ID that coincides with the final identifier is 0, the process proceeds to step S83.

In step S83, the processor 41 deletes, in the same document ID, information belonging to IDs after the ID that coincides with the final identifier and until the ID in which the end flag indicates 1.

Then, in step S84, the processor 41 sets 1 in the end flag of the ID that coincides with the final identifier.

The processor 41 may execute this processing by referring to the print request status which has been sent, together with the final identifier, from the image forming apparatus 20. For example, if the controller 41 determines that the end flag of the ID that coincides with the final identifier is 1 and that the print request status indicates "terminated", the process may proceed from step S82 to S83.

An operation performed by the image processing system 1 will be described below.

A description will first be given, with reference to FIGS. 9 and 10, of an example of a series of processing operations in the image processing system 1.

Figure 9:
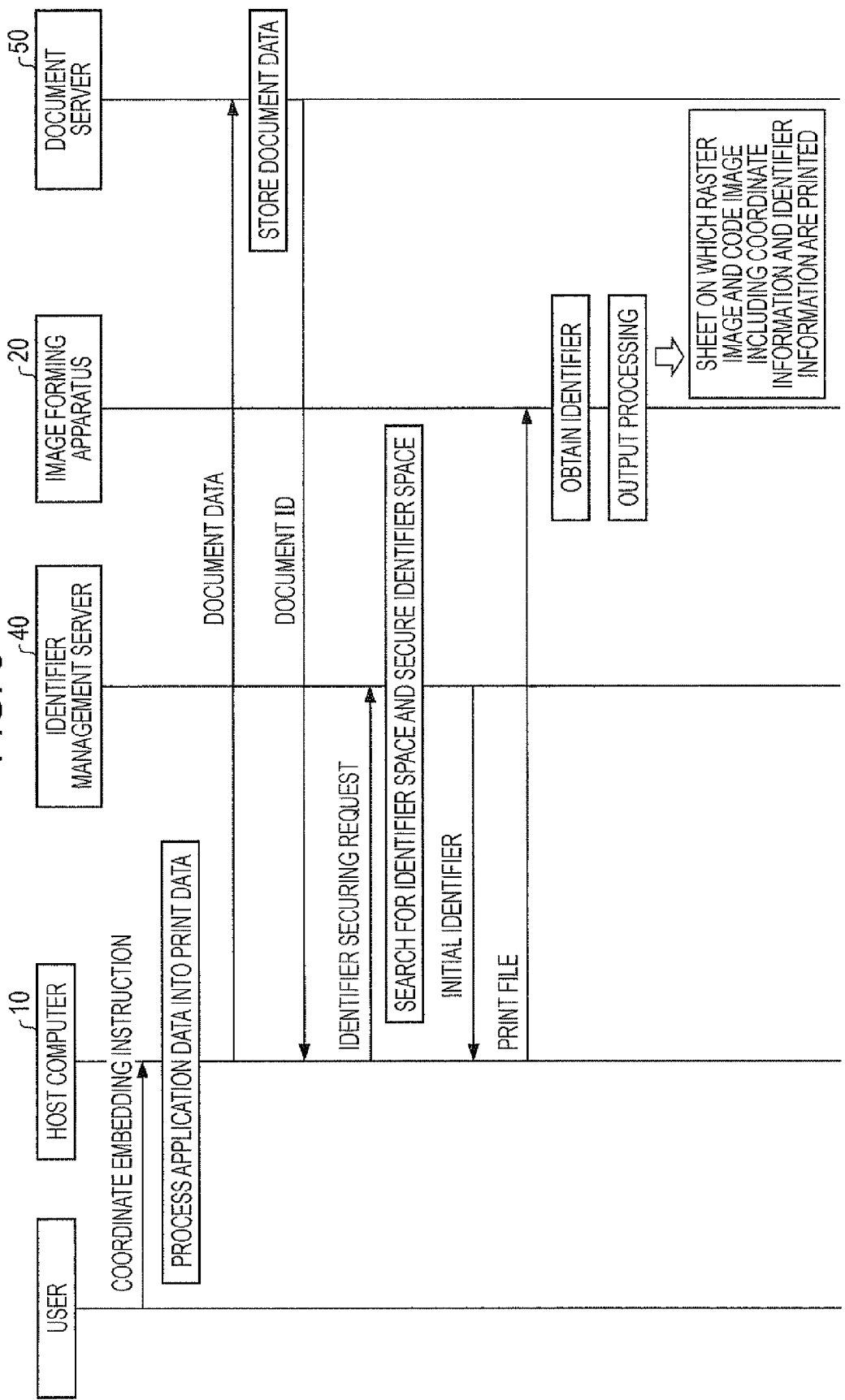
FIG. 9 illustrates an example of a series of processing operations in the image processing system.

In FIG. 9, in response to an instruction to perform printing (output setting) and to embed coordinate information from a user, the host computer 10 sends document data to the document server 50 by using the communication medium 80.

Upon receiving the document data from the host computer 10, the document server 50 stores the received document data and the document ID in the storage unit 52, and also returns the document ID to the host computer 10. If region information is also sent from the host computer 10, the document server 50 also stores the region information in the storage unit 52 in association with the document data and the document ID.

Upon receiving the document ID from the document server 50, the host computer 10 sends an identifier securing request to the identifier management server 40 by using the communication medium 80.

Upon receiving the identifier securing request from the host computer 10, the identifier management server 40 searches for a free identifier space and secures it, and then stores items of information concerning a set of identifiers forming the secured identifier space, the initial identifier of the identifiers, and the number of logical pages in association with one another. The identifier management server 40 then sends initial identifier information to the host computer 10.

Upon receiving the initial identifier information from the identifier management server 40, the host computer 10 creates one print file on the basis of print data, output format instructions, a coordinate information embedding instruction, and the initial identifier information. The host computer 10 then sends the created print file to the image forming apparatus 20 by using the communication medium 80.

The image forming apparatus 20 receives the print file. If a coordinate information embedding instruction is contained in the print file received from the host computer 10, the image forming apparatus 20 obtains an identifier for each physical page on the basis of the initial identifier contained in the print file. The image forming apparatus 20 also generates a coordinate information image for each physical page. The image forming apparatus 20 then generates a code image including the identifier information and the coordinate information image for each physical page. Then, the image forming apparatus 20 combines the generated code image with the raster image based on the print data in units of physical pages and thereby generates a composite image. The image forming apparatus 20 then forms the generated composite image on a sheet.

Figures 11, 12A, 12B:
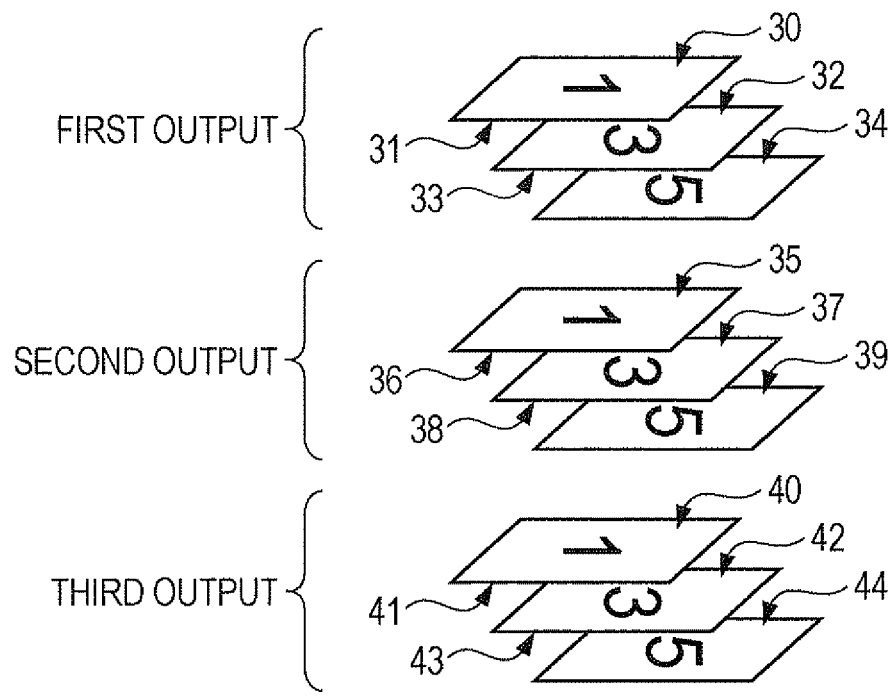
FIG. 11 illustrates examples of identifiers associated with individual physical pages in the case of the collate output.
FIGS. 12A and 12B illustrate examples of print request statuses and final identifiers sent from the image forming apparatus to the identifier management server.

FIG. 11 illustrates examples of identifiers associated with individual physical pages in the case of the collate output. In this example, three print copies of document data representing five logical pages are output in accordance with the collate output.

As shown in FIG. 11, the image forming apparatus 20 respectively assigns identifiers 30, 31, 32, 33, and 34 to print pages having the physical page numbers 1, 2, 3, 4, and 5 associated with the logical page numbers 1, 2, 3, 4, and 5 forming the first output. The image forming apparatus 20 also respectively assigns identifiers 35, 36, 37, 38, and 39 to print pages having the physical page numbers 6, 7, 8, 9, and 10 associated with the logical page numbers 1, 2, 3, 4, and 5 forming the second output. The image forming apparatus 20 also respectively assigns identifiers 40, 41, 42, 43, and 44 to print pages having the physical page numbers 11, 12, 13, 14, and 15 associated with the logical page numbers 1, 2, 3, 4, and 5 forming the third output. In this manner, the image forming apparatus 20 assigns identifiers calculated by computation similar to that (e.g., see FIG. 3) conducted by the identifier management server 40 to physical pages.

Figure 10:
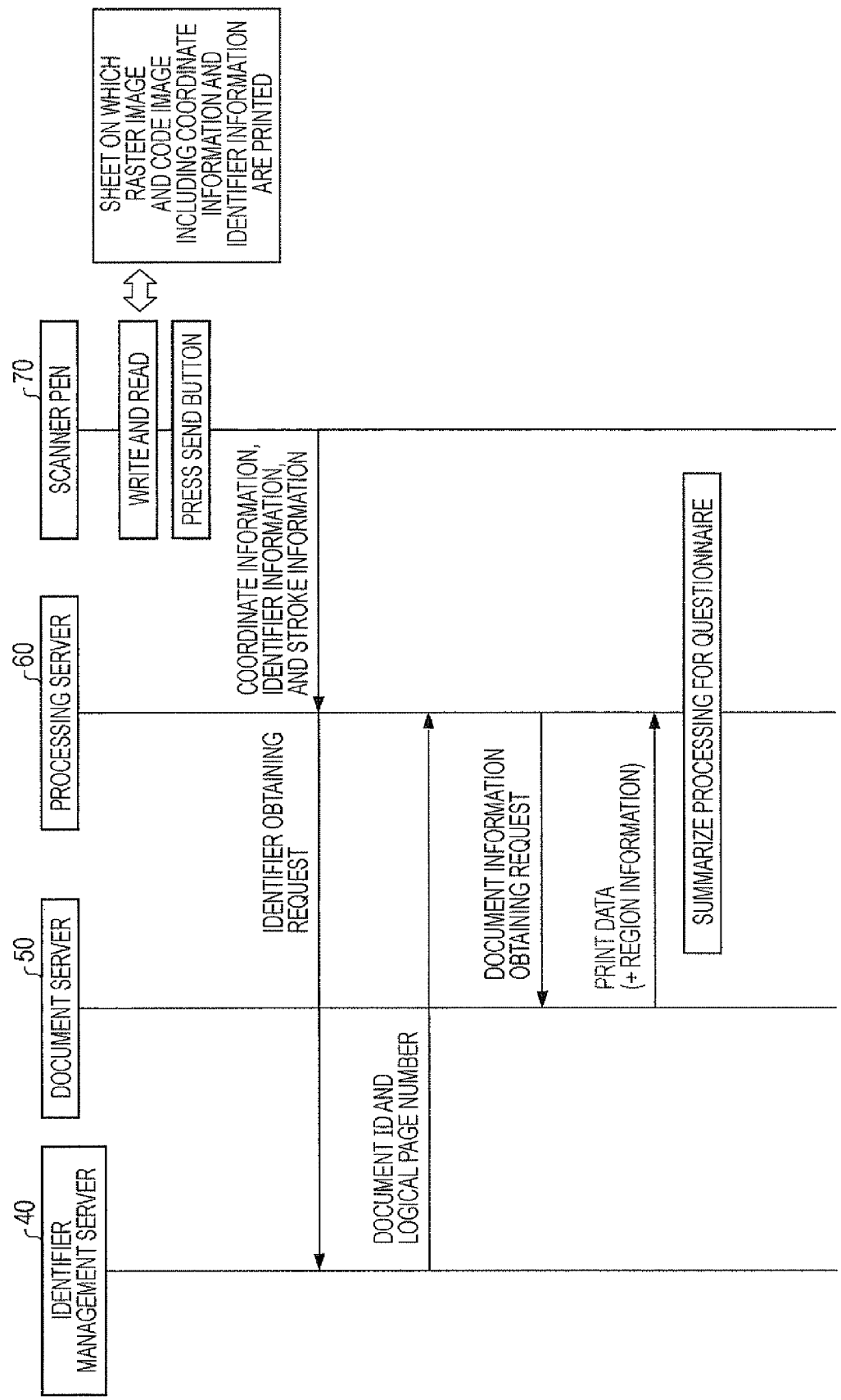
FIG. 10 illustrates another example of a series of processing operations in the image processing system.

As shown in FIG. 10, the scanner pen 70 writes information into a sheet and reads a code image embedded in the sheet. The scanner pen 70 then reads coordinate information and identifier information from the code image, and then sends the read coordinate information and identifier information, together with stroke information, to the processing server 60.

Upon receiving the information from the scanner pen 70, the processing server 60 sends an identifier obtaining request to the identifier management server 40 by using the identifier contained in the information.

Upon receiving the identifier obtaining request from the processing server 60, the identifier management server 40 returns the document ID, the logical page number, etc. associated with the identifier corresponding to the identifier obtaining request to the processing server 60.

Upon receiving the document ID, the logical page number, etc. from the identifier management server 40, the processing server 60 sends a document information obtaining request to the document server 50 by using the received document ID and the logical page number.

Upon receiving the document information obtaining request from the processing server 60, the document server 50 obtains print data (document information, etc., corresponding to the logical page number) corresponding to the document ID and the logical page number contained in the document information obtaining request. The document server 50 then sends the obtained print data to the processing server 60. If the document server 50 stores region information, it also sends the region information to the processing server 60.

Upon receiving the print data (document information, etc.) from the document server 50, the processing server 60 performs summarize processing for, for example, questionnaires, by using the print data and stroke information.

An example of questionnaire summarize processing will be described.

It is now assumed that a user inputs region information into the host computer 10 and that the document server 50 registers therein region information (information concerning a specific coordinate region and items to be written into such a specific coordinate region). For example, if the region information indicates a check box having a small rectangular configuration, it includes a coordinate region defining the coordinates of the check box and configuration information concerning configurations, such as the cross "x" mark and the check mark "✓", of signs written into the check box.

In this case, the processing server 60 receives region information, together with print data, from the document server 50 and identifies which type of information indicated in the region specified by the coordinate information. For example, on the basis of coordinate information and stroke information concerning signs written into a questionnaire sheet by using the scanner pen 70 and sent from the scanner pen 70, the processing server 60 identifies the cross "x" mark or the check mark "✓" indicated in the check box.

As items to be written into a check box, not only signs, but also numeric value information, Japanese characters, and Chinese characters, may be registered. Then, the processing server 60 recognizes stroke information by using an optical character reader (OCR) as characters, thereby recognizing numeric value information, Japanese characters, or Chinese characters.

The processing server 60 then performs summarize processing for the recognized information as electronic data.

The processing server 60 performs questionnaire summarize processing as described above. Then, the user of the processing server 60 can summarize the result of questionnaires without the need to collect questionnaire sheets and to manually summarize the contents of information written in the questionnaire sheets, thereby improving the efficiency in performing summarize processing for questionnaires.

In the image processing system 1 as described above, if a print request is canceled and discontinued by a user, the image forming apparatus 20 sends information concerning the print request status stored as the print request information and the final identifier to the identifier management server 40 (steps S10 and S18). In this case, the final identifier informed to the identifier management server 40 is the identifier having the largest numeric value among identifiers assigned to pages for which printing has been normally ended in response to the print request by the image forming apparatus 20 (steps S48 and S49).

Upon receiving information concerning the print request status and the final identifier from the image forming apparatus 20, the identifier management server 40 refers to a table, such as the table shown in FIG. 3, which is used for managing IDs. If the end flag of the ID that coincides with the final identifier is 0, the identifier management server 40 performs identifier recovery processing. More specifically, the identifier management server 40 deletes, in the same document ID, information belonging to IDs after the ID that coincides with the final identifier, and also sets 1 in the end flag of the ID that coincides with the final identifier (steps S81 through S84). With this processing, the identifier management server 40 recovers identifiers that were not used from a secured identifier space.

FIGS. 12A and 12B illustrate examples of the print request statuses and the final identifiers sent from the image forming apparatus 20 to the identifier management server 40.

Assuming that the end flag of the ID 44 is 1, as in the table shown in FIG. 3, if the final identifier having the ID 44 is sent, as shown in FIG. 12A, the identifier management server 40 does not perform identifier recovery processing.

However, if the final identifier having the ID 34 is sent, as shown in FIG. 12B, the identifier management server 40 performs identifier recovery processing since the end flag of the ID 34 is 0. More specifically, as the identifier recovery processing, as shown in FIG. 13, the identifier management server 40 deletes information belonging to the IDs 35 through 44 after the ID 34 that coincides with the final identifier in the document ID DOC001, and also sets 1 in the end flag of the ID 34.

As a result, thereafter, upon receiving an identifier securing request from the host computer 10, the identifier management server 40 secures a free identifier space starting from the ID 35, which is larger than ID 34 in which the end flag indicates 1. In this case, however, only ten IDs from the ID 35 to the ID 44 can be assigned to a print request. Accordingly, if the total number of physical pages required in a print request corresponding to the identifier securing request is ten or less, the identifier management server 40 secures the IDs 35 through 44 as a free identifier space. In this case, the ID 35 is used as the initial identifier.

FIG. 14 illustrates an example of a table in which recovered identifiers are secured again as a free identifier space (which can be assigned to a print request).

If a print request is a request to print five print copies of a document having two logical pages in accordance with the collate output, as shown in FIG. 14, the IDs 35 through 44 are secured as a free identifier space.

In this manner, the identifier management server 40 specifies, among a set of identifiers provided to the image forming apparatus 20, identifiers that were not combined with an image printed on a print medium, and provides the specified identifiers for the use of another print request.

In this exemplary embodiment, the controller 31 forms, for example, first, second, and third obtaining units and a transmission unit. The image forming unit 23 forms, for example, an output unit. The controller 31 and the memory 32 form, for example, a combining unit.

The invention is not restricted to the above-described exemplary embodiment.

For example, if it is assumed that identifiers are serially assigned to physical pages, a final identifier may be used as identifier information indicating which identifiers have already been output. Alternatively, all the output identifiers may be stored in a table. In this case, instead of the final identifier, the image forming apparatus 20 may send information indicating all the output identifiers to the identifier management server 40. Then, on the basis of the information indicating all the output identifiers, the identifier management server 40 specifies, among a set of identifiers provided to the image forming apparatus 20, identifiers that were not combined with an image formed on a print medium, and provides the specified identifiers for the use of another print request.

Alternatively, instead of sending information indicating all the output identifiers, on the basis of information concerning a set of identifiers provided by the identifier management server 40 and information concerning output identifiers, the image forming apparatus 20 may detect identifiers other than the output identifiers from the set of identifiers, and may send the detected identifiers, together with the print request status, to the identifier management server 40. With this operation, the identifier management server 40 provides identifiers other than the output identifiers sent from the image forming apparatus 20 for the use of another print request.

In this exemplary embodiment, the print request status is stored as the print request information. Alternatively, another item of information may also be stored as the print request information. In this case, if necessary, the image forming apparatus 20 may also send such an item of information, together with the print request status, to the identifier management server 40.

Second Exemplary Embodiment

A second exemplary embodiment will be described below. Components configured similarly to those of the first exemplary embodiment are designated by like reference numerals.

In the second exemplary embodiment, the image forming apparatus 20 stores final identifier information, together with a print request status, in a storage unit. Meanwhile, the identifier management server 40 requests the image forming apparatus 20 to send a final identifier and obtains the final identifier.

A description will first be given of processing performed by the image forming apparatus 20 according to the second exemplary embodiment.

Processing for storing final identifier information, together with a print request status, in a storage unit will be discussed first.

Figure 15:
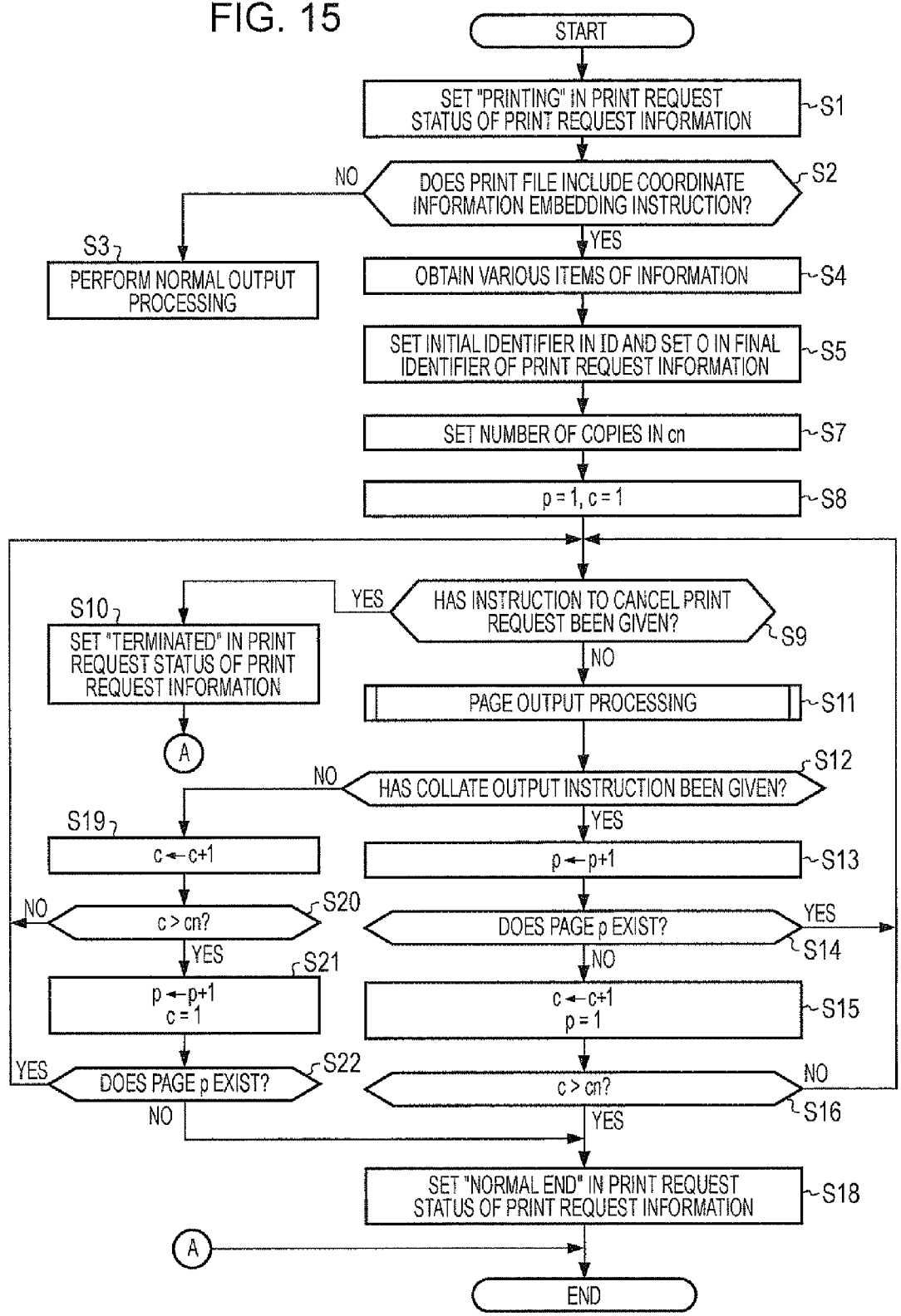
FIG. 15 is a flowchart illustrating printing processing according to a second exemplary embodiment.
Figure 16:
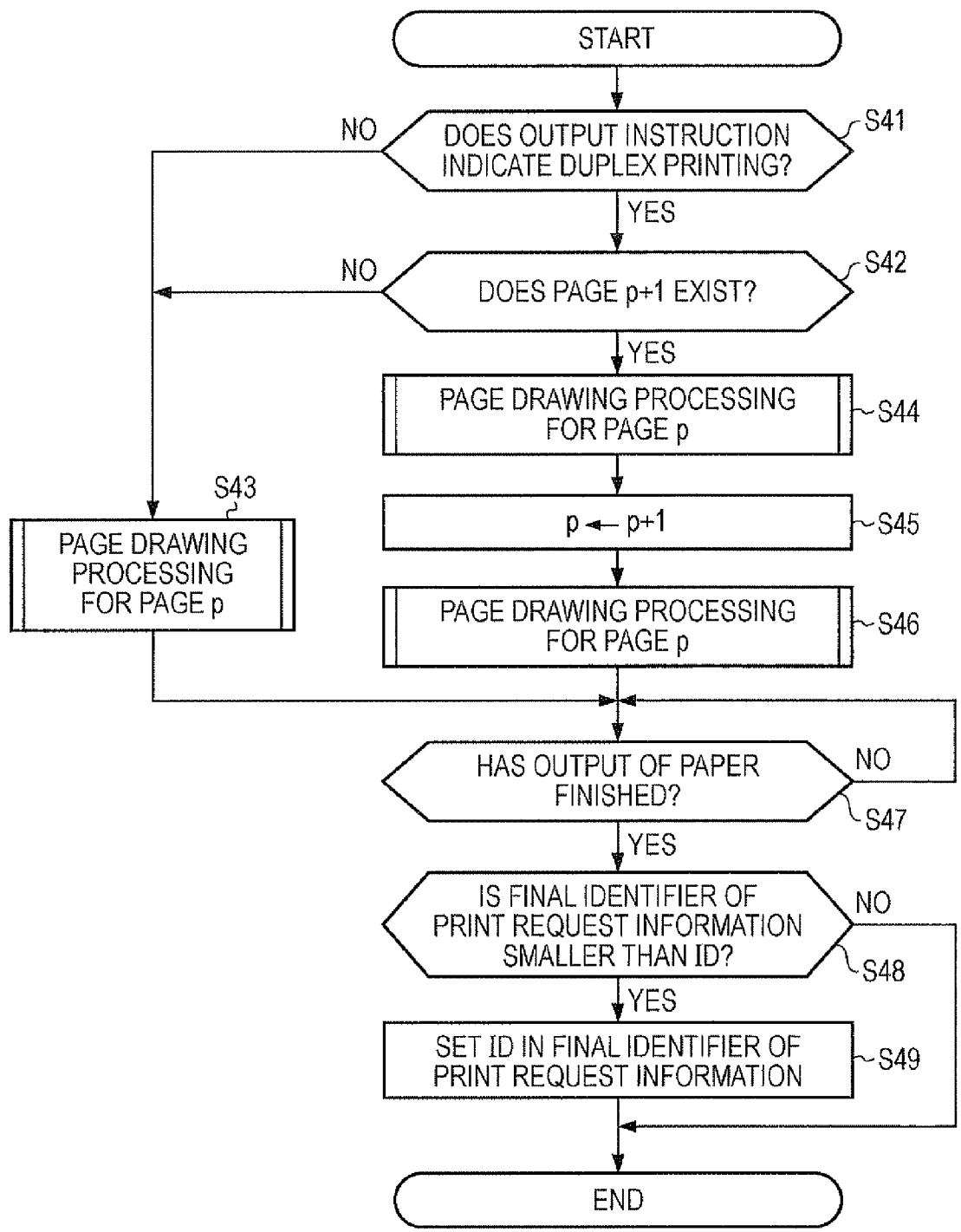
FIG. 16 is a flowchart illustrating output processing in units of physical pages according to the second exemplary embodiment.

FIGS. 15 and 16 are flowcharts illustrating an example of the processing according to the second exemplary embodiment. FIG. 15 is a flowchart illustrating printing processing. FIG. 16 is a flowchart illustrating output processing in units of physical pages.

The printing processing shown in FIG. 15 does not include steps S6 or S17, unlike the first exemplary embodiment. The image forming apparatus 20 does not perform processing for voluntarily sending a final identifier to the identifier management server 40.

Generally, an image forming apparatus is configured to store a print request status of print request information in a storage unit, such as a non-volatile memory, e.g., the HDD 33, as print request information. In the second exemplary embodiment, a final identifier is also stored in the storage unit as print request information.

In the second exemplary embodiment, therefore, in step S5, 0 is set in the final identifier to be stored as the print request information.

In accordance with the processing in step S5, in the output processing in units of physical pages in step S11 shown in FIG. 16, the controller 31 determines in step S48 whether the final identifier stored as the print request information is smaller than the ID. If the result of step S48 is YES, the controller 31 sets the ID in the final identifier stored as the print request information in step S49.

A description will now be given of processing, performed by the image forming apparatus 20, for correcting print request information stored in a storage unit, if necessary, when power is turned ON.

Figure 17:
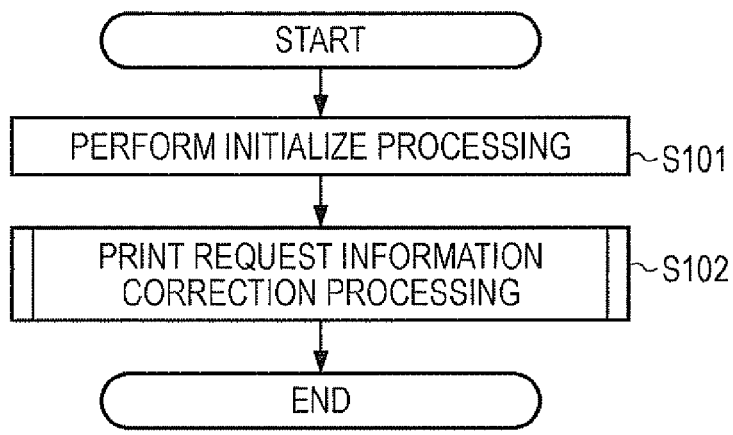
FIG. 17 is a flowchart illustrating power ON processing according to the second exemplary embodiment.

FIG. 17 is a flowchart illustrating an example of such correction processing, which is referred to as the "power ON processing". The image forming apparatus 20 executes this processing by using the controller 31.

In FIG. 17, in step S101, the controller 31 executes initialize processing in order to perform image forming processing.

Then, in step S102, the controller 31 executes print request information correction processing. After finishing the print request information correction processing, the controller 31 completes the power ON processing shown in FIG. 17.

Figure 18:
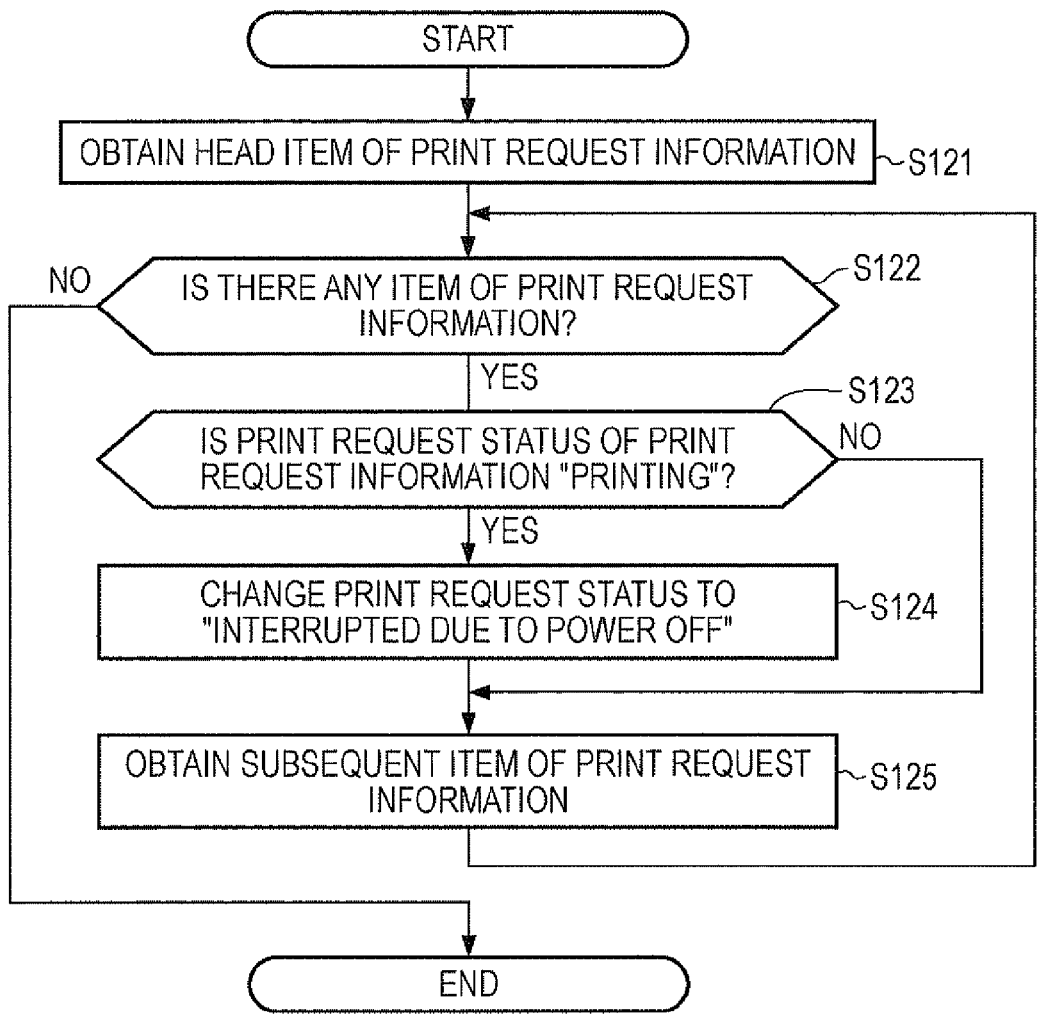
FIG. 18 is a flowchart illustrating print request information correction processing according to the second exemplary embodiment.

FIG. 18 is a flowchart illustrating an example of the print request information correction processing in step S102 of FIG. 17.

In FIG. 18, in step S121, the controller 31 obtains the head item of print request information. That is, the image forming apparatus 20 obtains, among items of print request information stored in the storage unit during the previous power ON period, the head item of the print request information (information concerning a print request which was executed first).

Then, in step S122, the controller 31 determines whether there is an item of print request information. If there is no item of print request information, there is no print request information to be corrected. Accordingly, the print request information correction processing shown in FIG. 18 is discontinued. If it is determined in step S122 that there is an item of print request information, the process proceeds to step S123.

For example, when the process proceeds from step S121 to step S122, if the controller 31 determines that there is no head item of print request information, it discontinues the print request information correction processing shown in FIG. 18.

Additionally, when the process returns from step S125 to step S122, if the controller 31 determines that there is no subsequent item of print request information, it discontinues the print request information correction processing shown in FIG. 18.

In step S123, the controller 31 determines whether the print request status of the print request information is "printing". If the result of step S123 is YES, the process proceeds to step S124. If the result of step S123 is NO, the process proceeds to step S125.

In step S124, the controller 31 changes the print request status to "interrupted due to power OFF". The process then proceeds to step S125.

In step S125, the controller 31 obtains the subsequent item of print request information from the storage unit, and then restarts processing from step S122.

A description will now be given of processing performed by the image forming apparatus 20 when receiving a request to send final identifier information from the identifier management server 40.

Figure 19:
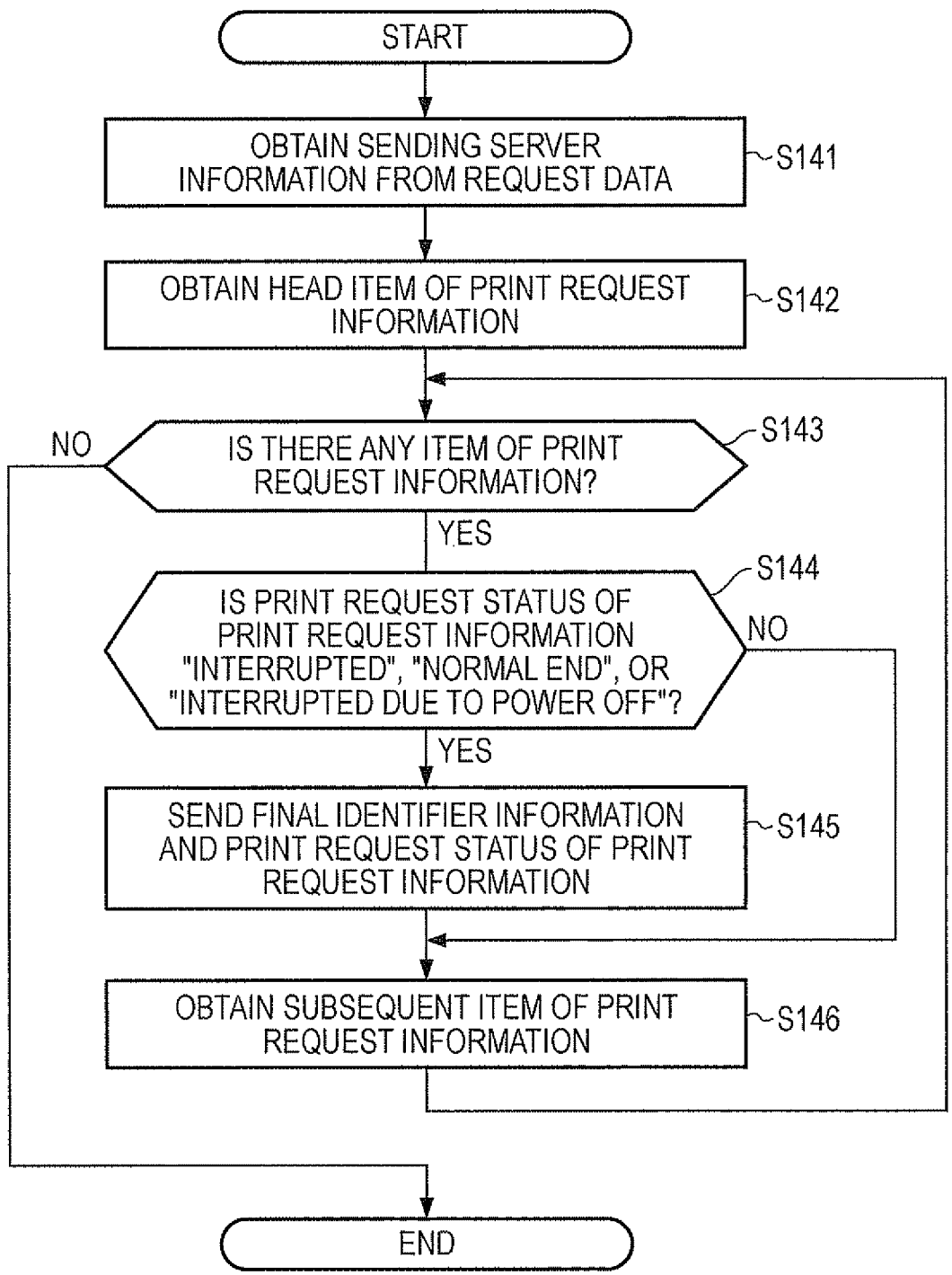
FIG. 19 is a flowchart illustrating final-identifier-information request reception processing according to the second exemplary embodiment.

FIG. 19 is a flowchart illustrating an example of final-identifier-information request reception processing. The image forming apparatus 20 executes the processing shown in FIG. 19 by using the controller 31.

In FIG. 19, in step S141, the controller 31 obtains sending server information from data representing a final identifier information request sent from the identifier management server 40. For example, the controller 31 obtains an IF address of the identifier management server 40 as the sending server information.

Then, in step S142, the controller 31 obtains the head item of print request information. For example, the controller 31 obtains the head item of print request information among items of print request information which were stored in the storage unit after handling the previous final identifier information request. That is, the controller 31 obtains the head item of print request information among items of print request information that have not been sent to the identifier management server 40.

Then, in step S143, the controller 31 determines whether there is an item of print request information. If the controller 31 determines that there is no item of print request information, it discontinues the final-identifier-information request reception processing shown in FIG. 19. If the controller 31 determines that there is an item of print request information, the process proceeds to step S144.

In step S144, the controller 31 determines whether the print request status of the print request information is "interrupted", "normal end", or "interrupted due to power OFF". If the controller 31 determines in step S144 that the print request status of the print request information is one of the statuses "interrupted", "normal end", and "interrupted due to power OFF", the process proceeds to step S145. If the controller 31 determines in step S144 that the print request status of the print request information is none of the statuses "interrupted", "normal end", and "interrupted due to power OFF", the process proceeds to step S146.

In step S145, the controller 31 sends the final identifier information and the print request status of the print request information determined in step S144 to the identifier management server 40 which was specified on the basis of the sending server information obtained in step S141. The process then proceeds to step S146.

In step S146, the controller 31 obtains the subsequent item of print request information. The process then returns to step S143 and the controller 31 restarts processing from step S143.

A description will now be given of final identifier sending request processing performed by the identifier management server 40 to request the image forming apparatus 20 to send a final identifier.

Figure 20:
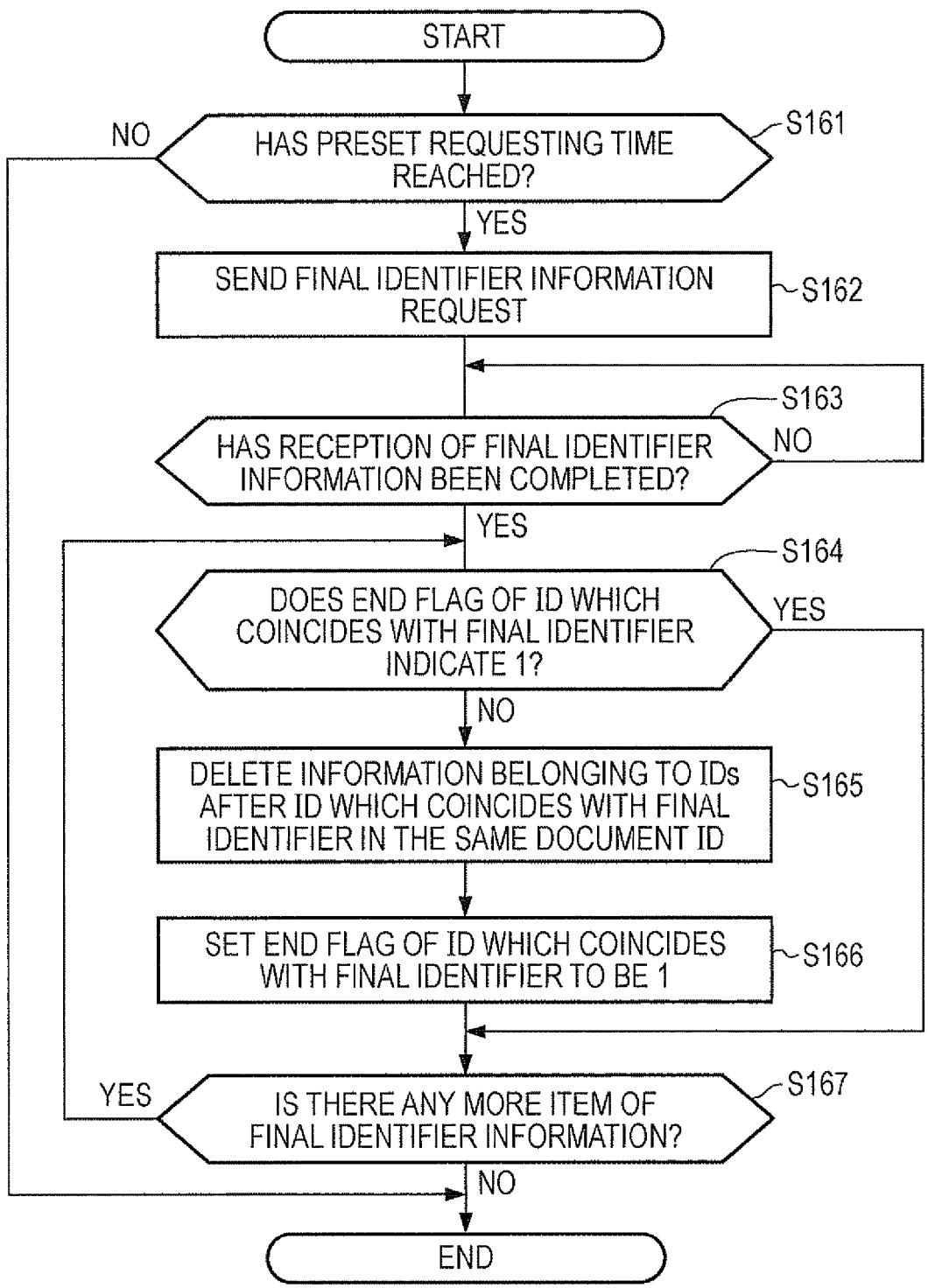
FIG. 20 is a flowchart illustrating identifier recovery processing according to the second exemplary embodiment.

FIG. 20 is a flowchart illustrating an example of such final identifier sending request processing, which is also referred to as the "identifier recovery processing". The identifier management server 40 executes the processing shown in FIG. 20 by using the processor 41.

In FIG. 20, in step S161, the processor 41 determines whether a preset requesting time has arrived. If the processor 41 determines that the preset requesting time has arrived, the process proceeds to step S162. If the processor 41 determines that the preset requesting time has not arrived, the processor 41 discontinues the identifier recovery processing shown in FIG. 20. The preset requesting time arrives, for example, once a day.

In step S162, the processor 41 sends a final identifier information request to the image forming apparatus 20. For example, the processor 41 manages, in a table, the image forming apparatus 20 to which the identifier management server 40 has sent initial identifier information in response to an identifier securing request, and sends a final identifier information request to the image forming apparatus 20.

Then, in step S163, the controller 41 determines whether the reception of final identifier information sent from the image forming apparatus 20 has finished. If the result of step S163 is YES, the process proceeds to step S164.

If plural items of final identifier information are sent from the image forming apparatus 20 in response to plural print requests, the processor 41 determines in step S163 whether the reception of all the items of final identifier information has finished.

Additionally, it is possible that the image forming apparatus 20 does not send any final identifier information. Thus, the processor 41 may discontinue the identifier recovery processing shown in FIG. 20 after a predetermined time has elapsed.

In step S164, the controller 41 determines whether the end flag of the ID that coincides with the final identifier is 1. If the result of step S164 is YES, the process proceeds to step S167. If the result of step S164 is NO, i.e., if the end flag of the ID that coincides with the final identifier is 0, the process proceeds to step S165.

In step S165, the processor 41 deletes, in the same document ID, information belonging to IDs after the ID that coincides with the final identifier.

Then, in step S166, the processor 41 sets 1 in the end flag of the ID that coincides with the final identifier. The process then proceeds to step S167.

In step S167, the processor 41 determines whether there is any more item of final identifier information received from the image forming apparatus 20. If the processor 41 determines that there is no more item of final identifier information, the controller 41 completes the identifier recovery processing shown in FIG. 20. If the processor 41 determines that there is another item of final identifier information, the process returns to step S164, and the controller 41 restarts processing from step S164. Accordingly, the processor 41 executes processing from step S164 for the subsequent item of final identifier information.

The configurations of the other components of the image processing system 1 of the second exemplary embodiment are similar to those of the image processing system 1 of the first exemplary embodiment.

Operations performed by the image processing system 1 of the second exemplary embodiment will now be described below.

In the image processing system 1 of the second exemplary embodiment, if there is print request information in which the print request status is "printing", the image forming apparatus 20 changes the print request status to the "interrupted due to power OFF" (see FIGS. 17 and 18). The reason for this change of the print request status is as follows. If power is turned OFF during the execution of a print request, the print request status of the print request information is changed to "interrupted due to power OFF". Moreover, in that print request information, the maximum identifier indicating a value of 0, or if one page has been printed, the maximum identifier indicating a value of 1 or larger, is stored.

Upon receiving a final identifier information request to send final identifier information to the identifier management server 40, the image forming apparatus 20 sends one of the print request status "interrupted", "normal end", and "interrupted due to power OFF", and the maximum identifier associated with the print request status (stored in the same print request information) to the identifier management server 40 (FIG. 19).

Meanwhile, upon receiving the print request status and the final identifier from the image forming apparatus 20 in response to the final identifier information request, the identifier management server 40 refers to a table, such as the table shown in FIG. 3, which is used for managing IDs. If the end flag of the ID that coincides with the final identifier is 0, the identifier management server 40 deletes, in the same document ID, information corresponding to IDs after the ID that coincides with the final identifier and until the ID in which the end flag indicates 1 (steps S161 through S165). The identifier management server 40 also sets the end flag of the ID that coincides with the final identifier to be 1 (step S166). With this operation, the identifier management server 40 recovers identifiers that were not used from a secured identifier space.

Figure 21:
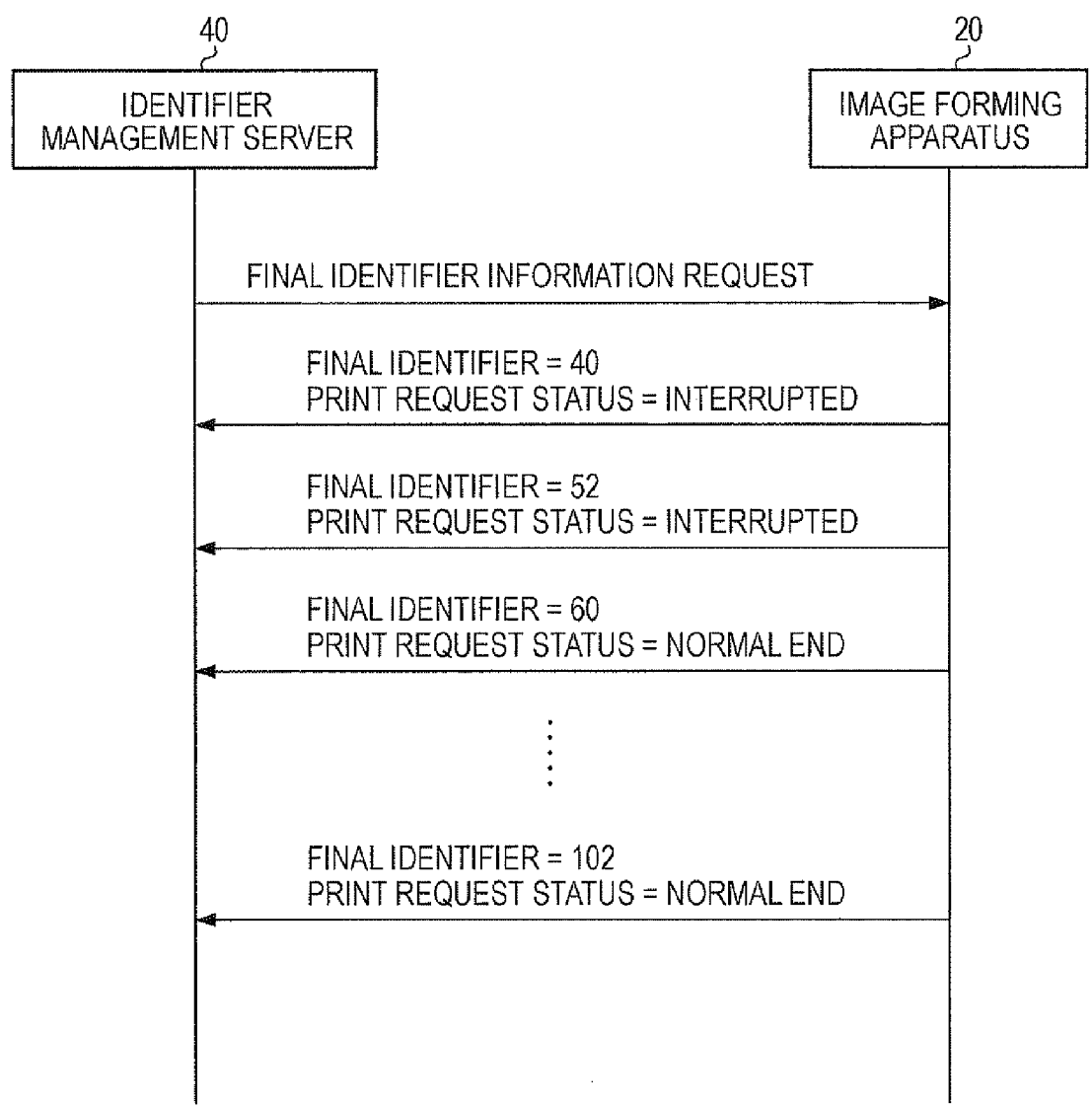
FIG. 21 illustrates a sequence of communication between the image forming apparatus and the identifier management server.

FIG. 21 illustrates a sequence of communication between the image forming apparatus 20 and the identifier management server 40 in accordance with the above-described processing.

As shown in FIG. 21, upon receiving a final identifier information request from the identifier management server 40, the image forming apparatus 20 returns a print request status and a final identifier to the identifier management server 40. In this case, if plural items of print request information are stored, as shown in FIG. 21, the image forming apparatus 20 sends print request statuses and final identifiers associated with the plural items of print request information to the identifier management server 40.

Upon receiving the final identifiers, the identifier management server 40 performs identifier recovery processing for each final identifier (FIG. 20).

Third Exemplary Embodiment

A third exemplary embodiment will be described below. Components configured similarly to those of the second exemplary embodiment are designated by like reference numerals.

In the third exemplary embodiment, only when, among identifiers assigned to a print request, there is an identifier which has not been output, the image forming apparatus 20 sends final identifier information to the identifier management server 40.

A description will first be given of processing performed by the image forming apparatus 20 to store final identifier information and assigned final identifier information, together with a print request status, in the storage unit.

Figure 22:
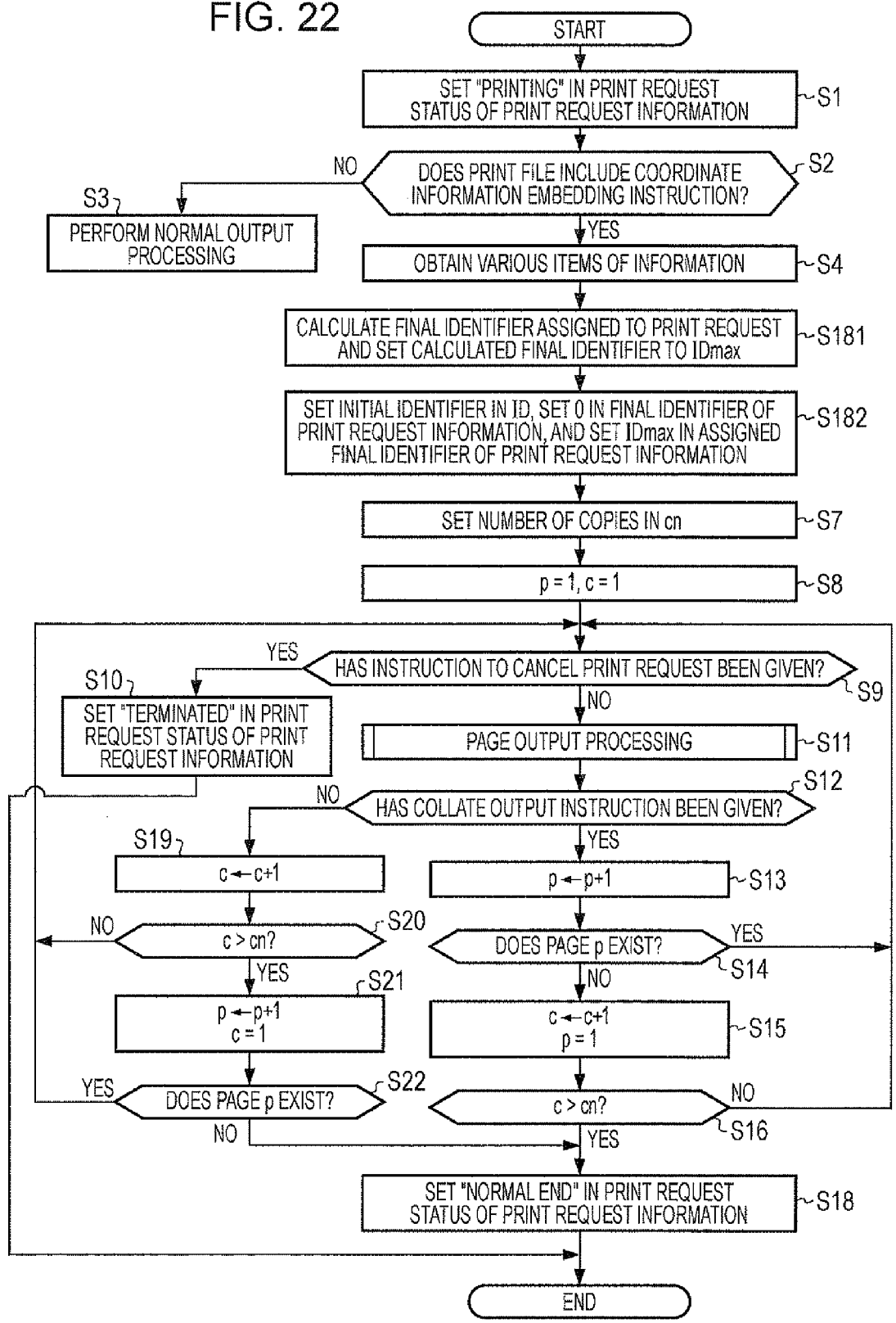
FIG. 22 is a flowchart illustrating printing processing according to a third exemplary embodiment.

FIG. 22 is a flowchart illustrating an example of printing processing. The image forming apparatus 20 executes the processing shown in FIG. 22 by using the processor 31.

In FIG. 22, in step S181 after step S4, the controller 31 calculates the final identifier (maximum identifier) assigned to the print request. That is, the controller 31 calculates the maximum identifier in an identifier space secured by the identifier management server 40. Then, the controller 31 sets the calculated final identifier in IDmax.

For example, the controller 31 calculates the final identifier according to equation (1).

$$\text{Final identifier} = \text{initial identifier} - 1 + \text{the number of logical pages} \times \text{the number of outputs} \quad (1)$$

Accordingly, if the number of logical pages is three, the number of outputs is four, and the initial identifier is twelve, the controller 31 calculates the final identifier according to the following equation.

$$\text{Final identifier} = 12 - 1 + 3 \times 4 = 23$$

Then, in step S182, the controller 31 sets the initial identifier in the ID. The controller 31 also sets 0 in the final identifier. The controller 31 also sets IDmax which is set in step S181 in the assigned final identifier. The process then proceeds to step S7, and the controller 31 executes processing similar to that of the second exemplary embodiment.

Processing executed by the image forming apparatus 20 when receiving a final identifier sending request from the identifier management server 40 will now be described.

Figure 23:
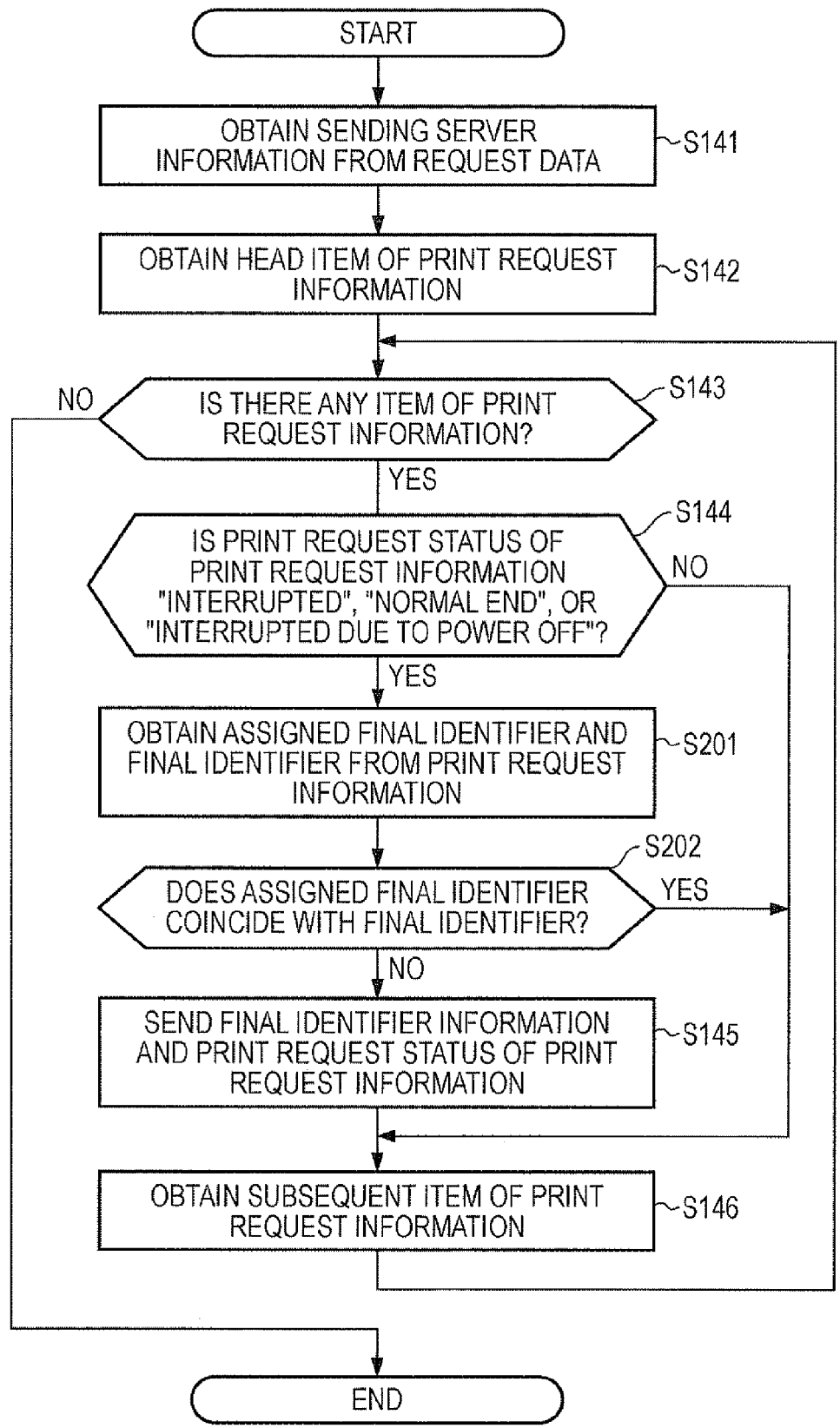
FIG. 23 is a flowchart illustrating final-identifier-information request reception processing according to the third exemplary embodiment.

FIG. 23 is a flowchart illustrating an example of final-identifier-information request reception processing. The image forming apparatus 20 executes the processing shown in FIG. 23 by using the controller 31.

In FIG. 23, if the result of step S144 is YES, the process proceeds to step S201. In step S201, the controller 31 obtains an assigned final identifier and a final identifier from the print request information.

Then, in step S202, the controller 31 determines whether the assigned final identifier obtained in step S201 coincides with the final identifier. If the controller 31 determines that the assigned final identifier coincides with the final identifier (assigned final identifier=final identifier), the process proceeds to step S146. If the controller 31 determines that that the assigned final identifier does not coincide with the final identifier (assigned final identifier≠final identifier), the process proceeds to step S145.

The configurations of the other components of the image processing system 1 of the third exemplary embodiment are similar to that of the image processing system 1 of the second exemplary embodiment.

Operations performed by the image processing system 1 of the third exemplary embodiment will now be described.

In the image processing system 1 of the third exemplary embodiment, the image forming apparatus 20 stores, for each print request, an assigned final identifier and a final identifier in the print request information (see FIG. 16 for acquisition of the final identifier). Then, upon receiving a final identifier information request from the identifier management server 40, only when the print request status is one of the statuses "interrupted", "normal end", and "interrupted due to power OFF" and only when the assigned final identifier does not coincide with the final identifier, does the image forming apparatus 20 send the print request status and the final identifier to the identifier management server 40 (FIG. 23).

The fact that the assigned final identifier does not coincide with the final identifier in the print request means that, among identifiers assigned the print request, identifiers positioned in a range from the identifier one larger than the final identifier to the assigned final identifier are not yet output.

The image forming apparatus 20 sends final identifier information to the identifier management server 40 only when there is an identifier which is not yet output among identifiers assigned to a print request.

The invention is not restricted to the above-described exemplary embodiment.

If identifiers are serially assigned to physical pages in ascending order, the above-described processing may be executed. However, by assuming cases other than the case where identifiers are serially assigned in accordance with the order in which physical pages are output, the image forming apparatus 20 may store a table indicating whether or not identifiers have been output. With this arrangement, the image forming apparatus 20 searches for identifiers stored in the table, and if there is an identifier which has not been output, the image forming apparatus 20 sends final identifier information to the identifier management server 40.

Fourth Exemplary Embodiment

A fourth exemplary embodiment will be described. Components configured similarly to those of the first exemplary embodiment are designated by like reference numerals.

In the fourth exemplary embodiment, box printing processing is executed.

The box printing is performed on the precondition that, when a print request includes an instruction to store document data in a reprinting box, the image forming apparatus 20 stores the document data in the reprinting box provided in the HDD 33. With this operation, when receiving a request to print the stored document data, the image forming apparatus 20 reprints the document data as box printing.

Processing executed by the image forming apparatus 20 in the fourth exemplary embodiment will be described first.

A description will first be given of box printing processing performed by the image forming apparatus 20 on the basis of document data stored in a box.

Figure 24:
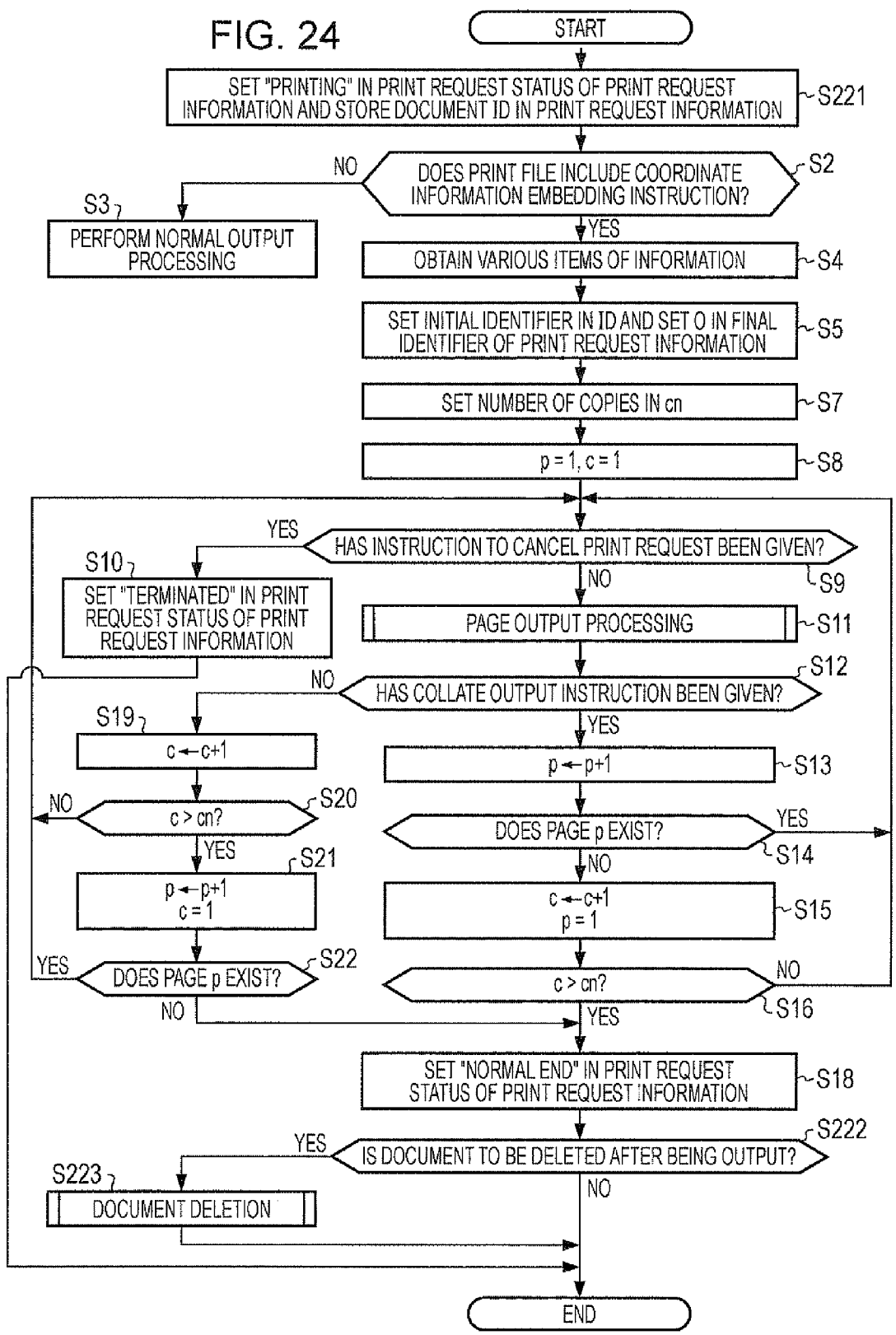
FIG. 24 is a flowchart illustrating box document printing processing according to a fourth exemplary embodiment.

FIG. 24 is a flowchart illustrating an example of box document printing processing. The image forming apparatus 20 performs this processing by using the controller 31.

As shown in FIG. 24, the box document printing processing is similar to the printing processing shown in FIG. 15.

In the fourth exemplary embodiment, however, after starting the box document printing processing, in step S221, controller 31 sets the print request status of the print request information to be "printing", and also stores, in the print request information, a document ID which is currently used, i.e., a document ID corresponding to the print request handled in the box document printing processing. The process then proceeds to step S2.

In the fourth exemplary embodiment, after the controller 31 sets the print request status of the print request information to "normal end" in step S18, the process proceeds to step S222. In step S222, the controller 31 determines whether an instruction to delete the document stored in the reprinting box has been given by the user. If the result of step S222 is YES, the process proceeds to step S223. If the result of step S222 is NO, the controller 31 completes the box document printing processing shown in FIG. 24.

In step S223, the controller 31 performs document deletion processing.

Figure 25:
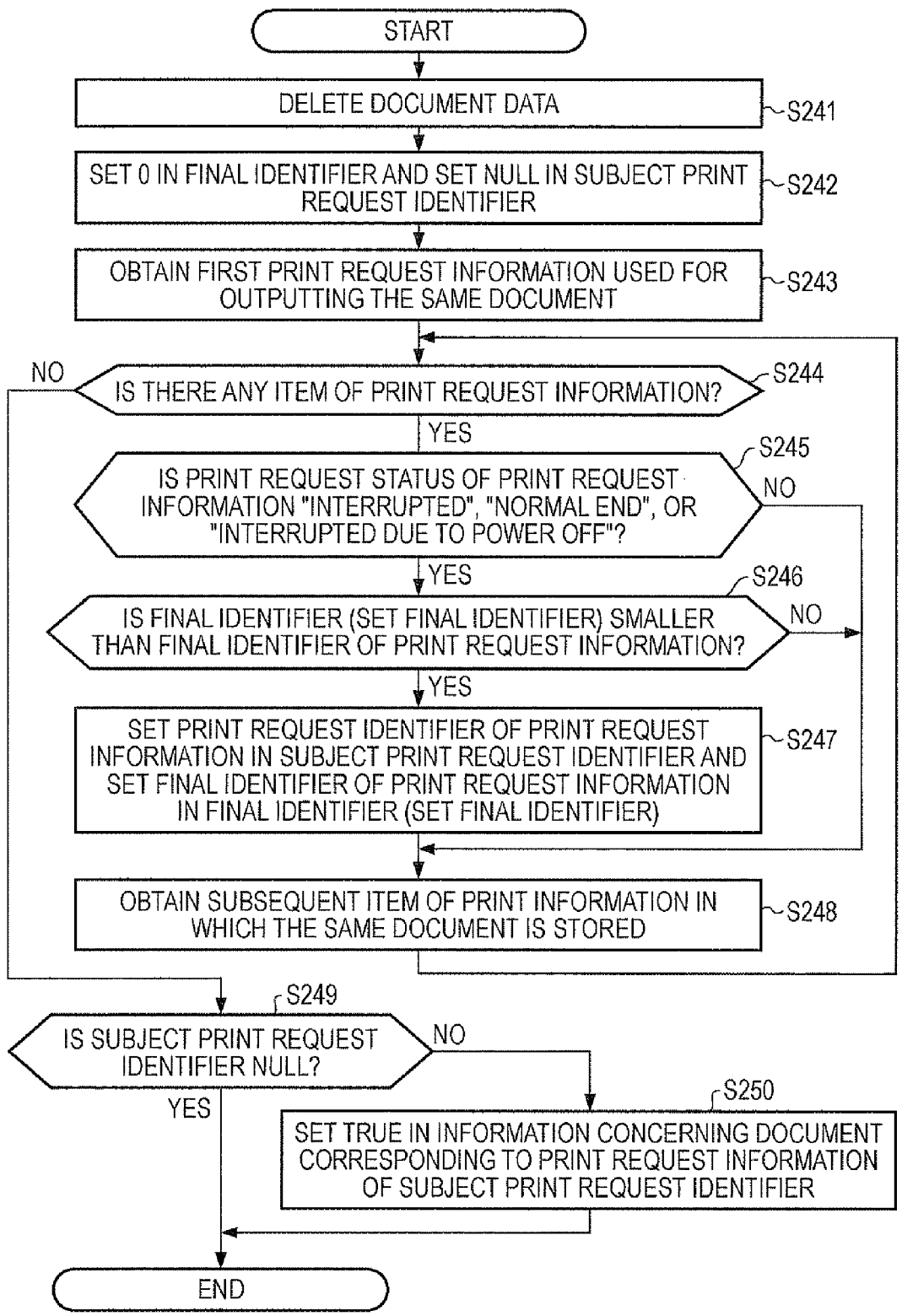
FIG. 25 is a flowchart illustrating document deletion processing according to the fourth exemplary embodiment.

FIG. 25 is a flowchart illustrating an example of the document deletion processing.

In FIG. 25, in step S241, the controller 31 deletes the document data stored in the reprinting box.

Then, in step S242, the controller 31 sets 0 in the final identifier. The controller 31 also sets Null in a subject print request identifier. The subject print request identifier is an identifier for identifying a specific print request among print requests to print the same document.

Then, in step S243, the controller 31 obtains the print request information used for outputting the same document for the first time More specifically, the controller 31 obtains the print request information concerning the first print request among items of print request information in which the same document ID is stored.

Then, in step S244, the controller 31 determines whether there is any item of print request information. If the controller 31 determines that there is no item of print request information, the process proceeds to step S249. If the controller 31 determines that there is an item of print request information, the process proceeds to step S245.

In step S245, the controller 31 determines whether the print request status of the print request information found in step S244 is one of the statuses "interrupted", "normal end", and "interrupted due to power OFF". If the controller 31 determines in step S244 that the print request status of the print request information is one of the statuses "interrupted", "normal end", and "interrupted due to power OFF", the process proceeds to step S246. If the controller 31 determines in step S244 that the print request status of the print request information is none of the statuses "interrupted", "normal end", and "interrupted due to power OFF", the process proceeds to step S248.

In step S246, the controller 31 determines whether the final identifier (which is set in step S242 or step S247, which will be discussed later, such a final identifier will be hereinafter referred to as the "set final identifier") is smaller than the final identifier of the print request information handled in step S245. If the result of step S246 is YES (set final identifier<final identifier of print request information), the process proceeds to step S247. If the result of step S246 is NO (set final identifier≥final identifier of print request information), the process proceeds to step S248.

In step S247, the controller 31 sets the print request identifier of the print request information handled in step S245 in the subject print request identifier. The print request identifier of the print request information is information for identifying a specific print request. With this operation, among print requests to perform box printing on the same document (print requests to output the same document ID), the specific print request can be identified by the print request identifier of the print request information.

The controller 31 also sets the final identifier of the print request information handled in step S245 in the set final identifier. The process then proceeds to step S248.

In step S248, the controller 31 obtains the subsequent item of print request information among items of print request information used for outputting the same document. More specifically, the controller 31 obtains the subsequent item of print request information in which the same document ID is stored. The process then returns to step S244, and the controller 31 restarts processing from step S244.

In step S249, the controller 31 determines whether the subject print request identifier is Null. That is, the controller 31 determines whether processing for setting the print request identifier in the subject print request identifier in step S247 has been executed. If the controller 31 determines that the subject print request identifier is Null, it completes the document deletion processing shown in FIG. 25. If the controller 31 determines that the subject print request identifier is not Null, the process proceeds to step S250.

In step S250, the controller 31 sets TRUE in information concerning a document corresponding to the print request information for which it is determined in step S249 that the subject print request identifier is not Null. The controller 31 then completes the document deletion processing.

A description will now be given of processing when the image forming apparatus 20 has received a request to send final identifier information from the identifier management server 40.

Figure 26:
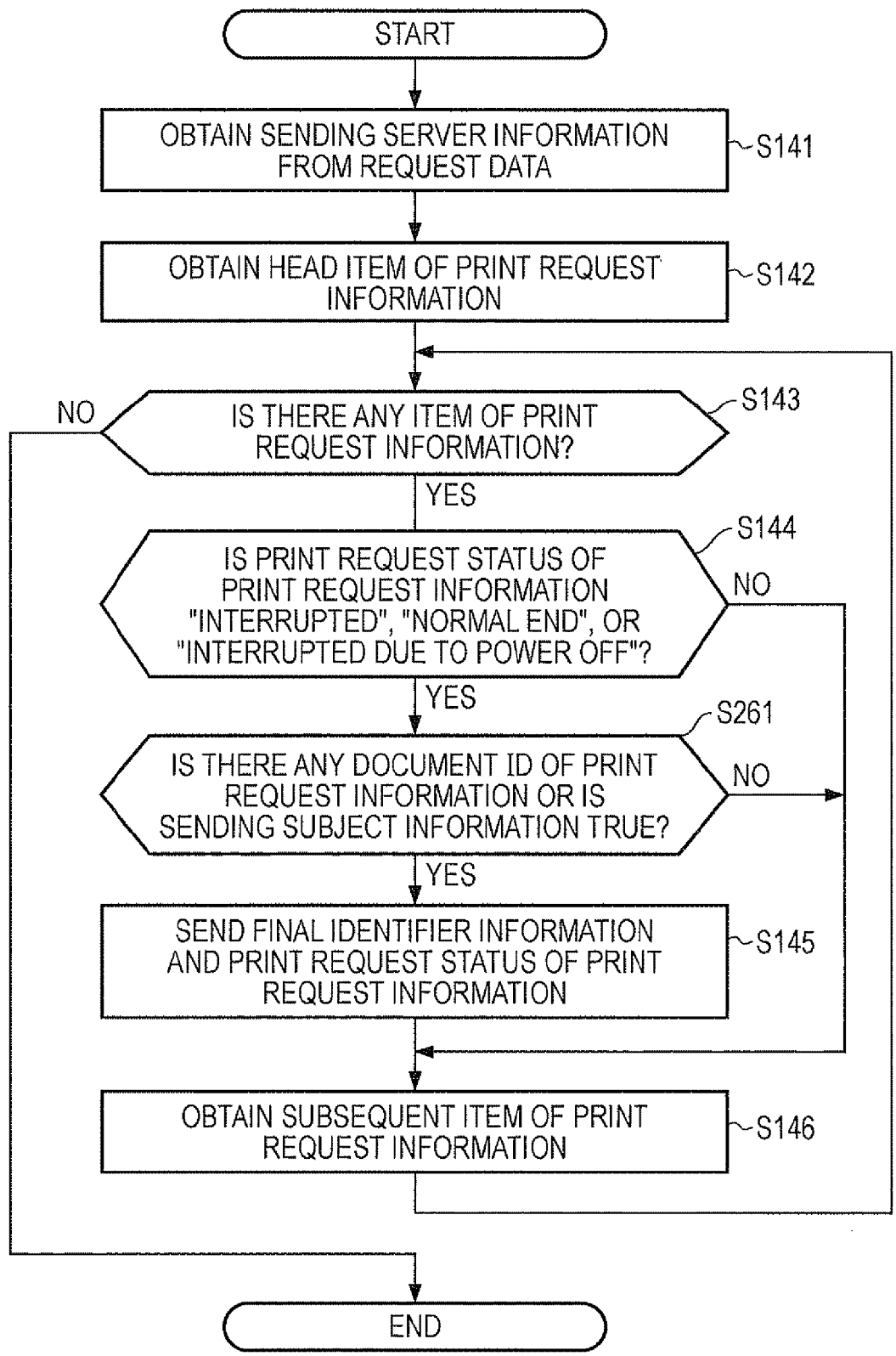
FIG. 26 is a flowchart illustrating final-identifier-information request reception processing according to the fourth exemplary embodiment.

FIG. 26 is a flowchart illustrating an example of such processing, which is also referred to as the "final-identifier-information request reception processing". The image forming apparatus 20 executes the processing shown in FIG. 26 by using the controller 31.

As shown in FIG. 26, if the result of step S144 is YES, the process proceeds to step S261. In step S261, the controller 31 determines whether one of the conditions that the document ID is not stored in the print request information handled in step S144 and that the information concerning a document corresponding to the print request information indicates TRUE is satisfied. If one of the conditions is satisfied, the process proceeds to step S145. If the controller 31 determines that the document ID is stored in the print request information handled in step S144 and that the information concerning a document corresponding to the print request information does not indicate TRUE, the process proceeds to step S146.

In step S145, the controller 31 sends the final identifier information and the print request status of the print request information for which one of the conditions is satisfied in step S261. The process then proceeds to step S146.

The configurations of the other components of the image processing system 1 of the fourth exemplary embodiment are similar to those of the image processing system 1 of the second exemplary embodiment.

Operations performed by the image processing system 1 of the fourth exemplary embodiment will be discussed.

In the image processing system 1 of the fourth exemplary embodiment, when performing box printing, the image forming apparatus 20 stores a document ID in print request information concerning a print request to perform box printing (step S221). Then, after the print request has been normally ended, if there is an instruction to delete the document, the document deletion processing is executed (steps S222 and S223).

In the document deletion processing, as shown in FIG. 25, the image forming apparatus 20 deletes the document data stored in the reprinting box (step S241). The image forming apparatus 20 then selects, among items of print request information in which the same document ID is stored, an item of print request information in which the print request status is one of the statuses "interrupted", "normal end", and "interrupted due to power OFF" and in which the final identifier has the maximum value (steps S245 and S246). The image forming apparatus 20 then sets the print request identifier of the selected print request information in the subject print request identifier (step S247). Then, the image forming apparatus 20 sets TRUE in information concerning a document corresponding to the print request information identified by the subject print request identifier (step S250).

With this operation, when receiving a final identifier information request from the identifier management server 40, the image forming apparatus 20 selects an item of print request information in which the print request status is one of the statuses "interrupted", "normal end", and "interrupted due to power OFF" and in which information concerning a document corresponding to the print request information indicates TRUE. The image forming apparatus 20 then sends the print request status and the final identifier of the selected item of print request information to the identifier management server 40 (FIG. 26). If the print request status is one of the statuses "interrupted", "normal end", and "interrupted due to power OFF" and if the document ID is not stored in the print request information, the image forming apparatus 20 also sends the print request status and the final identifier of the selected item of print request information to the identifier management server 40 (FIG. 26).

With the above-described processing, the image processing system 1 implements the following box printing operation.

When a print request includes an instruction to store document data in a reprinting box, the image forming apparatus 20 stores the document data in the reprinting box. In this case, the image forming apparatus 20 also stores print instruction information concerning the document data, together with the document data, in the reprinting box. With this operation, the document data and the print instruction information are retained in the image forming apparatus 20 even after power is turned OFF.

Then, when a user makes a request to print the document data stored in the reprinting box, the image forming apparatus 20 performs image formation on the basis of the document data and the print instruction information. In this case, the image forming apparatus 20 performs image formation by using the same identifier as that used for the previous print request. That is, since the print instruction remains the same, the image forming apparatus 20 performs image formation by using the same identifier. Then, every time a print request is made, the image forming apparatus 20 performs such a box printing operation unless the document stored in the box is deleted. The box printing operation may be performed for the use of storing, for example, a memorandum.

When receiving a print request to perform box printing, as described above, the image forming apparatus 20 performs box printing by using the same identifier as that used for the previous print request. In this case, it is possible that not all the identifiers forming an identifier space secured by the identifier management server 40 have been used when the first print request was made or when the print request to perform box printing by using the document data contained in the first print request was made. For example, such a situation may arise when the first print request or the print request to perform box printing was discontinued by the user.

In this case, if the identifier management server 40 performs identifier recovery processing simply because a print request has been completed (interrupted or normally ended), the following inconvenience may be caused. That is, if the identifier management server 40 makes some identifiers of the previously secured identifier space reusable and if the image processing apparatus 20 uses such identifiers for a print request to perform box printing, the identifiers which have been made reusable may be used twice.

In contrast, the image forming apparatus 20 of the fourth exemplary embodiment performs the following processing. If document data stored in the reprinting box is deleted in response to an instruction from the user, only when the print request status of the print request information is one of the statuses "interrupted", "normal end", and "interrupted due to power OFF", and only when the information concerning a document corresponding to the print request information indicates TRUE, does the image forming apparatus 20 send the print request status and the final identifier of the print request information to the identifier management server 40. That is, the image forming apparatus 20 sends the print request status and the final identifier of the print request information to the identifier management server 40 on the condition that box printing will not be performed again, i.e., the identifiers will not be used again in the box printing processing.

With this arrangement, in the fourth exemplary embodiment, the identifier management server 40 can be prevented from securing identifiers that may be used in box printing, as identifiers forming an identifier space for another print request. As a result, even if the image forming apparatus 20 is an apparatus that may perform box printing, the identifier management server 40 may select, among a set of identifiers provided to the image forming apparatus 20, identifiers that were not combined with an image printed on a print medium by the image forming apparatus 20, and may provide the selected identifiers for the use of another print request.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
    a processor configured to act as a first obtaining unit that obtains a print request including image forming data which is used for forming an image for each of logical pages;
    an output unit that outputs a print medium on which an image is formed on the basis of the image forming data;
    the processor further configured to act as a combining unit that obtains, in response to the print request, from an external device that manages identifiers for specifying output numbers indicating a chronological order in which sets of logical pages are output, information concerning each of identifiers forming a set of identifiers that specify the logical pages corresponding to the image forming data, an output number indicating a chronological order in which a set of the logical pages is output, and an end marker of each set of logical pages, the combining unit combining the obtained information with an image formed on each of physical pages output by the output unit;
    the processor further configured to act as a second obtaining unit that obtains information concerning each of the identifiers combined with the image formed on the print medium output by the output unit;
    the processor further configured to act as a third obtaining unit that obtains, if execution of the print request has stopped, print request stop information indicating a reason why the execution of the print request has stopped;
    a sending unit that sends the information concerning each of the identifiers obtained by the second obtaining unit and the print request stop information obtained by the third obtaining unit to the external device in association with each other; and
    the processor further configured to act as an identification management unit that, responsive to an indication that one of the end markers of one of the set of logical pages does not correspond to the print request stop information, deletes identifier information of an unused identifier of the corresponding set of logical pages.

2. The image forming apparatus according to claim 1, wherein:
    the third obtaining unit at least obtains, as the print request stop information, information indicating that the execution of the print request has been normally ended or information indicating that the execution of the print request has been interrupted; and
    the sending unit sends the information concerning each of the identifiers obtained by the second obtaining unit and the print request stop information obtained by the third obtaining unit to the external device if the execution of the print request has been normally ended or interrupted.

3. The image forming apparatus according to claim 1, further comprising:
- a first storage unit that stores in the first storage unit the information concerning each of the identifiers obtained by the second obtaining unit and the print request stop information obtained by the third obtaining unit in association with each other; and
- a receiving unit that receives an information sending request from the external device,
- wherein, if the receiving unit receives an information sending request from the external device, the sending unit sends the information concerning each of the identifiers and the print request stop information stored in the first storage unit to the external device such that the information concerning each of the identifiers and the print request stop information are associated with each other.

4. The image forming apparatus according to claim 1, wherein, if the information concerning each of the identifiers which form the set of identifiers obtained from the external device includes information concerning identifiers other than the information concerning the identifiers obtained by the second obtaining unit, the sending unit sends the information concerning each of the identifiers obtained by the second obtaining unit and the print request stop information obtained by the third obtaining unit to the external device.

5. The image forming apparatus according to claim 1, further comprising:
- a second storage unit that stores in the second storage unit the image forming data corresponding to the print request in a state in which it is possible to reprint the image forming data,
- wherein, if the image forming data is stored in the second storage unit, the sending unit does not send the information concerning each of the identifiers obtained by the second obtaining unit or the print request stop information obtained by the third obtaining unit to the external device.

6. The image forming apparatus according to claim 5, wherein:
- the external device obtains, as the set of identifiers, a plurality of identifiers having consecutive numbers in ascending order from an identifier space including a plurality of identifiers arranged as a sequence of numbers;
- the image forming apparatus further comprises a third storage unit that stores in the third storage unit a plurality of print requests, each of which is to form an image on a print medium by using the image forming data and the image forming data stored in the second storage unit, and that stores in the third storage unit a plurality of items of information concerning the identifiers obtained by the second obtaining unit when the print requests have been executed, the plurality of print requests and the plurality of items of information being stored in association with each other; and
- if the image forming data is deleted from the second storage unit, the sending unit selects, among the plurality of print requests stored in the third storage unit, a print request associated with an identifier having a maximum value, and sends, together with the print request stop information obtained by the third obtaining unit, to the external device, an item of information concerning an identifier obtained by the second obtaining unit when the print request associated with the identifier having the maximum value has been executed, the item of information concerning the identifier obtained by the second obtaining unit and the print request stop information obtained by the third obtaining unit being sent in association with each other.

7. The image forming apparatus according to claim 1, the processor further configured to act as a fourth obtaining unit that obtains information concerning an output format of the print medium output by the output unit,
wherein the external device obtains a set of identifiers that uniquely specify the logical pages corresponding to the image forming data regardless of the output format, on the basis of the number of logical pages and the information concerning the output format obtained by the fourth obtaining unit.

8. An image forming method comprising:
obtaining a print request including image forming data which is used for forming an image for each of logical pages;
obtaining, in response to the print request, from an external device that manages identifiers for specifying output numbers indicating a chronological order in which sets of logical pages are output, information concerning each of identifiers forming a set of identifiers that specify the logical pages corresponding to the image forming data, an output number indicating a chronological order in which a set of the logical pages is output, and an end marker of each set of logical pages, and combining the obtained information with an image which is formed on each of output physical pages on the basis of the image forming data;
obtaining information concerning each of the identifiers combined with an image formed on a print medium on which an image is formed on the basis of the image forming data;
obtaining, if execution of the print request has stopped, print request stop information indicating a reason why the execution of the print request has stopped;
sending the obtained information concerning each of the identifiers combined with the image formed on the print medium and the obtained print request stop information to the external device in association with each other; and
responsive to an indication that one of the end markers of one of the set of logical pages does not correspond to the print request stop information, deleting identifier information of an unused identifier of the corresponding set of logical pages.

9. An image forming system comprising:
a processor configured to act as a first obtaining unit that obtains a print request including image forming data which is used for forming an image for each of logical pages;
an output unit that outputs a print medium on which an image is formed on the basis of the image forming data;
the processor configured to act as a providing unit that manages identifiers for specifying output numbers indicating a chronological order in which sets of logical pages are output and that provides, in response to the print request, a set of identifiers that specify the logical pages corresponding to the image forming data, an output number indicating a chronological order in which a set of the logical pages is output, and an end marker of each set of logical pages;
the processor configured to act as a combining unit that combines information concerning each of identifiers which form the set of identifiers provided by the providing unit with an image formed on each of physical pages output by the output unit;

the processor configured to act as a second obtaining unit that obtains information concerning each of the identifiers combined with the image formed on the print medium output by the output unit;

the processor configured to act as a third obtaining unit that obtains, if execution of the print request has stopped, print request stop information indicating a reason why the execution of the print request has stopped;

a sending unit that sends the information concerning each of the identifiers obtained by the second obtaining unit and the print request stop information obtained by the third obtaining unit to the external device in association with each other; and the processor configured to act as an identification management unit that, responsive to an indication that one of the end markers of one of the set of logical pages does not correspond to the print request stop information, deletes identifier information of an unused identifier of the corresponding set of logical pages.

10. The image forming system according to claim 9, wherein, if the providing unit detects that the set of identifiers provided in response to the print request includes an identifier which has not been combined with an image formed on the print medium during the execution of the print request, on the basis of the information concerning each of the identifiers obtained by the second obtaining unit and the print request stop information obtained by the third obtaining unit, the providing unit provides the identifier which has not been combined with an image formed on the print medium in response to another print request.

11. A non-transitory computer readable medium storing a program causing a computer to execute a process, the process comprising:

obtaining a print request including image forming data which is used for forming an image for each of logical pages;

obtaining, in response to the print request, from an external device that manages identifiers for specifying output numbers indicating a chronological order in which sets of logical pages are output, information concerning each of identifiers forming a set of identifiers that specify the logical pages corresponding to the image forming data, an output number indicating a chronological order in which a set of the logical pages is output, and an end marker of each set of logical pages, and combining the obtained information with an image which is formed on each of output physical pages on the basis of the image forming data;

obtaining information concerning each of the identifiers combined with an image formed on a print medium on which an image is formed on the basis of the image forming data;

obtaining, if execution of the print request has stopped, print request stop information indicating a reason why the execution of the print request has stopped;

sending the obtained information concerning each of the identifiers combined with the image formed on the print medium and the obtained print request stop information to the external device in association with each other; and responsive to an indication that one of the end markers of one of the set of logical pages does not correspond to the print request stop information, deleting identifier information of an unused identifier of the corresponding set of logical pages.

* * * * *